US009467910B2

(12) United States Patent
Laganier et al.

(10) Patent No.: US 9,467,910 B2
(45) Date of Patent: Oct. 11, 2016

(54) HANDOVER METHODS AND APPARATUS

(71) Applicant: Luminate Wireless, Inc., Cupertino, CA (US)

(72) Inventors: Julien Laganier, San Francisco, CA (US); Amit Butala, Sunnyvale, CA (US)

(73) Assignee: LUMINATE WIRELESS, INC., Cupertino, CA (US)

( * ) Notice: Subject to any disclaimer, the term of this patent is extended or adjusted under 35 U.S.C. 154(b) by 29 days.

(21) Appl. No.: 14/329,842

(22) Filed: Jul. 11, 2014

(65) Prior Publication Data

US 2016/0014650 A1     Jan. 14, 2016

(51) Int. Cl.
*H04W 4/00* (2009.01)
*H04W 36/00* (2009.01)
*H04W 88/16* (2009.01)
*H04W 36/04* (2009.01)
*H04W 84/04* (2009.01)

(52) U.S. Cl.
CPC ..... *H04W 36/0083* (2013.01); *H04W 36/0055* (2013.01); *H04W 36/04* (2013.01); *H04W 84/045* (2013.01); *H04W 88/16* (2013.01)

(58) Field of Classification Search
CPC combination set(s) only.
See application file for complete search history.

(56) References Cited

U.S. PATENT DOCUMENTS

| 8,532,661 | B2 * | 9/2013 | Vikberg | H04W 36/08 455/436 |
| 8,724,590 | B2 * | 5/2014 | Bi | H04W 36/0055 370/331 |
| 9,107,110 | B2 * | 8/2015 | Zdarsky | H04W 8/082 |
| 9,237,442 | B2 * | 1/2016 | Xu | H04W 12/04 |
| 2011/0149905 | A1 | 6/2011 | Kim | |
| 2012/0163336 | A1 | 6/2012 | Adjakple et al. | |
| 2013/0070731 | A1 | 3/2013 | Lim et al. | |
| 2013/0201904 | A1 * | 8/2013 | Toskala | H04W 36/165 370/315 |
| 2015/0038145 | A1 * | 2/2015 | Nakata | H04W 36/0055 455/436 |

OTHER PUBLICATIONS

3GPP TS 36.413 V10.1.0, Technical Specification 3rd Generation Partnership Project; Technical Specification Group Radio Access Network; Evolved Universal Terrestrial Radio Access Network (E-UTRAN); S1 Application Protocol (S1AP) (Release 10), 256 pages, 2011.*
International Search Report from International Application No. PCT/US 2015/040032, pp. 1-3, dated Nov. 12, 2015.

(Continued)

*Primary Examiner* — Frank Duong
(74) *Attorney, Agent, or Firm* — Michael P. Straub; Stephen T. Straub; Ronald P. Straub

(57) ABSTRACT

Methods and apparatus for supporting handovers which are hidden from a Mobility Management Entity (MME) as well as handovers which are not hidden from the MME are described. A gateway, e.g., a home gateway (HGW), in a communications system acts as a concentration point for a plurality of small cell HeNBs. Two types of handovers, a visible handover and a hidden handover are supported. With a hidden handover, the handover is hidden from the SGW and the MME, thus reducing backhaul control signaling and loading on the SGW and MME. A gateway, e.g., a home gateway (HGW), receives a path switch request message for a user equipment (UE) device from a target access point, e.g., a home eNB (HeNB). In some embodiments the gateway, e.g., the HGW, decides whether a requested handover should be visible or should be hidden, and then performs a handover implementation in accordance with its decision.

18 Claims, 10 Drawing Sheets

(56) References Cited

OTHER PUBLICATIONS

Written Opinion of the International Searching Authority from International Application No. PCT/US 2015/040032, pp. 1-4, dated Nov. 12, 2015.
Enterprise small cell network architectures, Dec. 1, 2013, pp. 1-53, Release Two-Document 067.02.01, Small Cell Forum, UK.
3GPP TR 21.905 version 10.3.0 Release 10, Digital cellular telecommunications system (Phase 2+); Universal Mobile Telecommunications System (UMTS); LTE; Vocabulary for 3GPP Specifications, 65 pages, Mar. 2011.
3GPP TS 23.203 version 10.9.0 Release 10, Digital cellular telecommunications system (Phase 2+); Universal Mobile Telecommunications System (UMTS); LTE; Policy and charging control architecture, 134 pages, Sep. 2013.
3GPP TS 23.401 version 10.10.0 Release 10, LTE; General Packet Radio Service (GPRS) enhancements for Evolved Universal Terrestrial Radio Access Network (E-UTRAN) access, 281 pages, Apr. 2013.
3GPP TS 29.303 V10.4.0, 3rd Generation Partnership Project; Technical Specification Group Core Network and Terminals; Domain Name System Procedures; Stage 3 (Release 10), 56 pages, Sep. 2012.
3GPP TS 33.401 version 10.5.0 Release 10, Digital cellular telecommunications system (Phase 2+); Universal Mobile Telecommunications System (UMTS); LTE; 3GPP System Architecture Evolution (SAE); Security architecture, 118 pages, Jul. 2013.
3GPP TS 36.300 version 10.11.0 Release 10, LTE; Evolved Universal Terrestrial Radio Access (E-UTRA) and Evolved Universal Terrestrial Radio Access Network (E-UTRAN); Overall description; Stage 2, 211 pages, Sep. 2013.
3GPP TS 36.401 version 10.4.0 Release 10, LTE; Evolved Universal Terrestrial Radio Access Network (E-UTRAN); Architecture description, 22 pages, Jul. 2012.
3GPP TS 36.412 version 10.1.0 Release 10, LTE; Evolved Universal Terrestrial Radio Access Network (E-UTRAN); S1 signalling transport, 10 pages, Jun. 2011.
3GPP TS 36.413 version 9.8.0 Release 9, LTE; Evolved Universal Terrestrial Radio Access Network (E-UTAN); S1 Application Protocol (S1AP) (Release 10), 248 pages, Jan. 2012.
3GPP TS 36.413 version 10.6.0 Release 10, LTE; Evolved Universal Terrestrial Radio Access Network (E-UTRAN); S1 Application Protocol (S1AP), 262 pages, Jul. 2012.
3GPP TS 36.423 version 10.7.0 Release 10, LTE; Evolved Universal Terrestrial Radio Access Network (E-UTRAN); X2 Application Protocol (X2AP), 137 pages, Sep. 2013.
Internet Engineering Task Force (IETF), Request for Comments: 6296, IPv6-to-IPv6 Network Prefix Translation, 32 pages, Jun. 2011.
3GPP TS 23.007 version 10.7.0 Release 10, Digital cellular telecommunications system (Phase 2+); Universal Mobile Telecommunications System (UMTS); LTE; Restoration procedures, 54 pages, Apr. 2012.
3GPP TS 36.331 version 9.15.0 Release 9, LTE; Evolved Universal Terrestrial Radio Access (E-UTRA); Radio Resource Control (RRC); Protocol specification, 265 pages, Jul. 2013.
3GPP TS 36.133 version 10.16.0 Release 10, LTE; Evolved Universal Terrestrial Radio Access (E-UTRA); Requirements for support of radio resource management, 728 pages, Nov. 2014.
3GPP TS 36.213 version 10.12.0 Release 10, LTE; Evolved Universal Terrestrial Radio Access (E-UTRA); Physical layer procedures, 129 pages, Mar. 2014.
3GPP TS 36.211 version 10.7.0 Release 10, LTE; Evolved Universal Terrestrial Radio Access (E-UTRA); Physical cahannels and modulation, 103 pages, Apr. 2013.
3GPP TS 36.212 version 10.8.0 Release 10, LTE; Evolved Universal Terrestrial Radio Access (E-UTRA); Multiplexing and channel coding, 81 pages, Jul. 2013.
3GPP TS 36.101 version 10.16.0 Release 10, LTE; Evolved Universal Terrestrial Radio Access (E-UTRA); User Equipment (UE) radio transmission and reception, 340 pages, Nov. 2014.
"Propagation data and prediction methods for the planning of indoor radiocommunication systems and radio local area networks in the frequency range 900 MHz to 100 GHz", Recommendation ITU-R P.1238-7, Feb. 2012, pp. 1-28, International Telecommunication Union, Geneva.
Enhancing LTE Cell-Edge Performance via PDCCH ICIC, 2011, pp. 1-16, Fujitsu Network Communications Inc., Downloaded from http://www.fujitsu.com/downloads/TEL/fnc/whitepapers/Enhancing-LTE-Cell-Edge.pdf.
Perez-Vega, Garcia, "A Simple Approach to a Statistical Path Loss Model for Indoor Communications", 27th European Microwave Conference, Sep. 8-12, 1997, pp. 617-623, Downloaded from personales.unican.es.
S. Dolinar et al. "Code Performance as a Function of Block Size", TMO Progress Report 42-133, May 15, 1998, pp. 1-23, Downloaded from www.inference.phy.cam.ac.uk/ear23/papers/iscta.pdf).
3GPP TS 36.422 version 10.1.0 Release 10, LTE; Evolved Universal Terrestrial Radio Access Network (E-UTRAN); X2 signalling transport, 10 pages, Jun. 2011.
3GPP TS 29.281 version 10.3.0 Release 10, Universal Mobile Telecommunications System (UMTS); LTE; General Jacket Radio System (GPRS) Tunnelling Protocol User Plane (GTPv1-U), 27 pages, Oct. 2011.
Internet Engineering Task Force (IETF), Request for Comments: 5996, Internet Key Exchange Protocol Version 2 (IKEv2), 138 pages, Sep. 2010.
Internet Engineering Task Force (IETF), Request for Comments: 4193, Unique Local IPv6 Unicast Addresses, 16 pages, Oct. 2005.
Internet Engineering Task Force (IETF), Request for Comments: 1918, Address Allocation for Private Internets, 9 pages, Feb. 1996.
Internet Engineering Task Force (IETF), Request for Comments: 2131, Dynamic Host Configuration Protocol, 24 pages, Mar. 1997.
Internet Engineering Task Force (IETF), Request for Comments: 3315, Dynamic Host Configuration Protocol for IPv6 (DHCPv6), 101 pages, Jul. 2003.
Internet Engineering Task Force (IETF), Request for Comments: 4862, IPv6 Stateless Address Autoconfiguration, 30 pages, Sep. 2007.

\* cited by examiner

HANDOVER METHODS AND APPARATUS

FIELD

Various embodiments relate to handover methods and apparatus and, more particularly, to methods and apparatus which allow for handovers which may be hidden from one or more other nodes in a communications network.

BACKGROUND

Users with mobile devices are demanding ever increasing amounts of data from the wireless cellular systems to which they connect. This explosive growth has fueled the need for increasing amounts of cellular infrastructure, in particular a dramatically increased density of wireless access points (APs). To attempt to meet these increasing demands, there is a trend to substantially increase the number of available low power small cell APs, e.g., small cell Home eNodeBs (HeNBs). However, as typical cell size decreases, the frequency of handoffs for a user equipment (UE) device between APs tends to increase.

A typical handover, also sometimes referred to as a handoff, involves a relatively high level of control signaling to and from core network elements including a mobility management entity (MME) which normally oversees and keeps track of a mobile device, e.g., mobile node, as it moves through network and a serving gateway (SGW) through which an AP communicates information, about a mobile device being served by AP or as part of providing a service to the mobile device, to the MME and/or other network nodes. While in many systems a mobility management entity is provided with information relating to each handover of a mobile node from one access point to another, as the number of small access points and handoffs increases, the communications load to the mobility management entity may become significant if the MME is notified of all handoffs.

While it may be useful to notify an MME of some handoffs, it may be desirable from a signaling load perspective to hide or otherwise shield an MME from having to be notified of, and process signaling relating to, all handoffs particularly handoffs between small APs corresponding to the same gateway device.

It would be advantageous if new methods and apparatus could be developed which would support at least some hidden handovers, in which handover related control signaling between an MME and/or SGW can be reduced or eliminated as compared to handovers where the MME is fully notified of a handover.

SUMMARY

Various features relate to handover hiding in which the signaling between an MME and gateway device is minimized or eliminated in the case of at least some handovers, also referred to herein as handoffs, between access points.

The methods and apparatus are particularly well suited for use in systems including multiple small cells, e.g., pico or femto cells, where handovers of mobile devices may occur between APs which are connected to the MME via the same gateway device.

In some but necessarily all embodiments, a gateway, e.g., a home gateway (HGW), in a communications system acts as a concentration point for a plurality of small cells corresponding to small base stations. The small base stations may be implemented as femto or pico cell base stations which may and in some embodiments are implemented as LTE HeNBs which interact with an MME via a HGW.

In various embodiments, the communications system which supports the hidden handover features allows for two types of handovers, a visible handover and a hidden handover. With a hidden handover, the handover is hidden from a Serving Gateway (SGW) and the MME in the core of the network. This reduces backhaul control signaling and loading on the SGW and MME as compared to handovers where the MME is informed of the handover.

In some but not necessarily all embodiments, a gateway used to provide services to a mobile node and through which signaling to the MME relating to a mobile node occurs, e.g., the HGW, decides as to which handovers should be visible and which should be hidden. Based on the decision with regard to the type of handover, the handover corresponding to a mobile node, e.g., UE, is then performed.

While the HGW makes the decision as to whether a handover between APs should be hidden or not in at least some embodiments, this is not critical to the invention and another device in the network, e.g., a control entity or even a mobile device making a handover decision, could make the decision as to whether a handover should be hidden or not.

An exemplary method of operating a gateway, e.g., a home gateway (HGW), in accordance with some embodiments, includes: receiving a path switch request message for a user equipment (UE) device from a target access point, e.g., a home eNB (HeNB); making a decision whether to implement a hidden handover or a visible handover in response to said path switch request message; and implementing one of a hidden handover or a visible handover in accordance with said decision.

An exemplary gateway, e.g., a home gateway (HGW), in accordance with some embodiments, includes: a path switch request receive module configured to receive a path switch request message for a user equipment (UE) device (terminal) from a target access point (HeNB); a handover decision module configured to make a decision whether to implement a hidden handover or a visible handover in response to said path switch request message; and a handover implementation module configured to implement one of a hidden handover or a visible handover in accordance with said decision.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
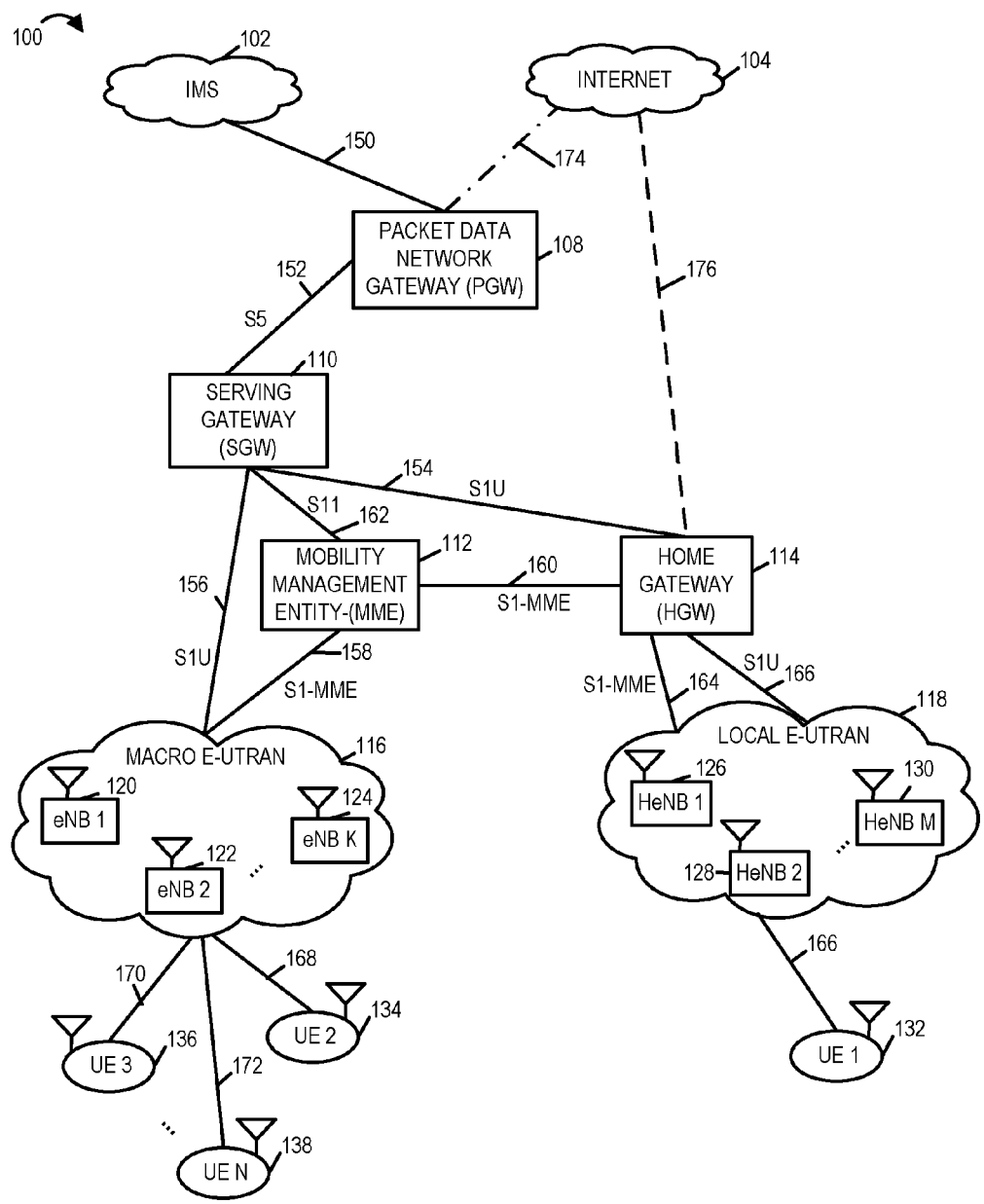
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes an IMS network 102, Internet network 104, a packet data network gateway (PGW) 108, a serving gateway (SGW) 110, a mobility management entity (MME) 112, a home gateway (HGW) 114, a macro E-UTRAN (Evolved UMTS Terrestrial Radio Access Network) 116, and a local E-UTRAN 118, which are coupled together. Macro E-UTRAN 116 includes a plurality of access points, which are e-nodeB's (eNB 1 120, eNB 2 122, . . . , eNB K 124). Local E-UTRAN 118 includes a plurality of access points which are Home e-nodeB's (HeNB 1 126, HeNB 2 128, . . . , HeNB M 130). The eNBs of the macro E-UTRAN 116 are, e.g., cellular base stations of a wireless radio network, e.g., a 4G network. The HeNBs of the local E-UTRAN 118 are, e.g., small cell, e.g., LTE Femto cell, base stations. Communication system 100 further includes a plurality of user equipment devices (UE 1 132, UE 2 134, UE 3 136, . . . , UE N 138). A UE device may be coupled to one or more eNBs or HeNBs, e.g., via one or more wireless communications links. For example, UE 1 132 is coupled to a HeNB in local E-UTRAN 118 via wireless link 168; UE 2 134 is coupled to an eNB in macro E-UTRAN 116 via wireless link 168; UE 3 136 is coupled to an eNB in macro E-UTRAN 116 via wireless link 170; and UE N 138 is coupled to an eNB in macro E-UTRAN 116 via wireless link 172.

PGW 108 is coupled to IMS network 102 via link 150. PGW 108 is coupled to Internet 104 via link 174. PGW 108 communicates with SGW 110 via S5 interface 152. SGW 110 communicates with HGW 114 via S1U interface 154. SGW 110 communicates with an eNB in the macro E-TRAN network 116 via an S1U interface, such as exemplary S1U interface 156. SGW 110 communicates with MME 112 via S11 interface 162. MME 112 communicates with an eNB in macro U-TRAN 116 via a S1-MME interface, such as exemplary S1-MME interface 158. MME 112 communicates with HGW 114 via S1-MME interface 160.

HGW 114 communicates with an HeNB in local E-UTRAN 118 via a S1-MME interface, such as exemplary S1-MME interface 164, and via a S1U interface such as exemplary S1U interface 166.

Note that the HeNBs (126, 128, . . . , 130), e.g., which correspond to Femto cells, of the local E-UTRAN 118, are not connected directly to the MME 112 or SGW 110, but rather are coupled to the HGW 114, which acts as a concentration point for the HeNBs, thus avoiding too many connections. The HGW 114 helps shield the core network including the SGW 110 and MME 112 from the burden of overseeing a very large number of HeNBs. The HGW 114 acts as a data and control traffic concentrator. Instead of many separate S1 connections corresponding to different HeNBs, the MME sees 1 S1 connection from the HGW 114.

HGW 114 makes decisions as to which handovers should be visible handovers and which handovers should be hidden handover. Handover is sometimes also referred to as handoff. When HGW 114 implements a hidden handover, HGW 114 generates signals which would otherwise be initiated by SGW 110 or MME 112 in the case of a visible handover, e.g., an end marker message and a path switch request acknowledgment. In various embodiments, in the case of a visible handover, the path switch request acknowledgment sent to the target HeNB includes a new security key, and in the case of a hidden handover the path switch request acknowledgment to the target HeNB includes an indication that no new security keys are being provided as part of the handover.

Figure 2:
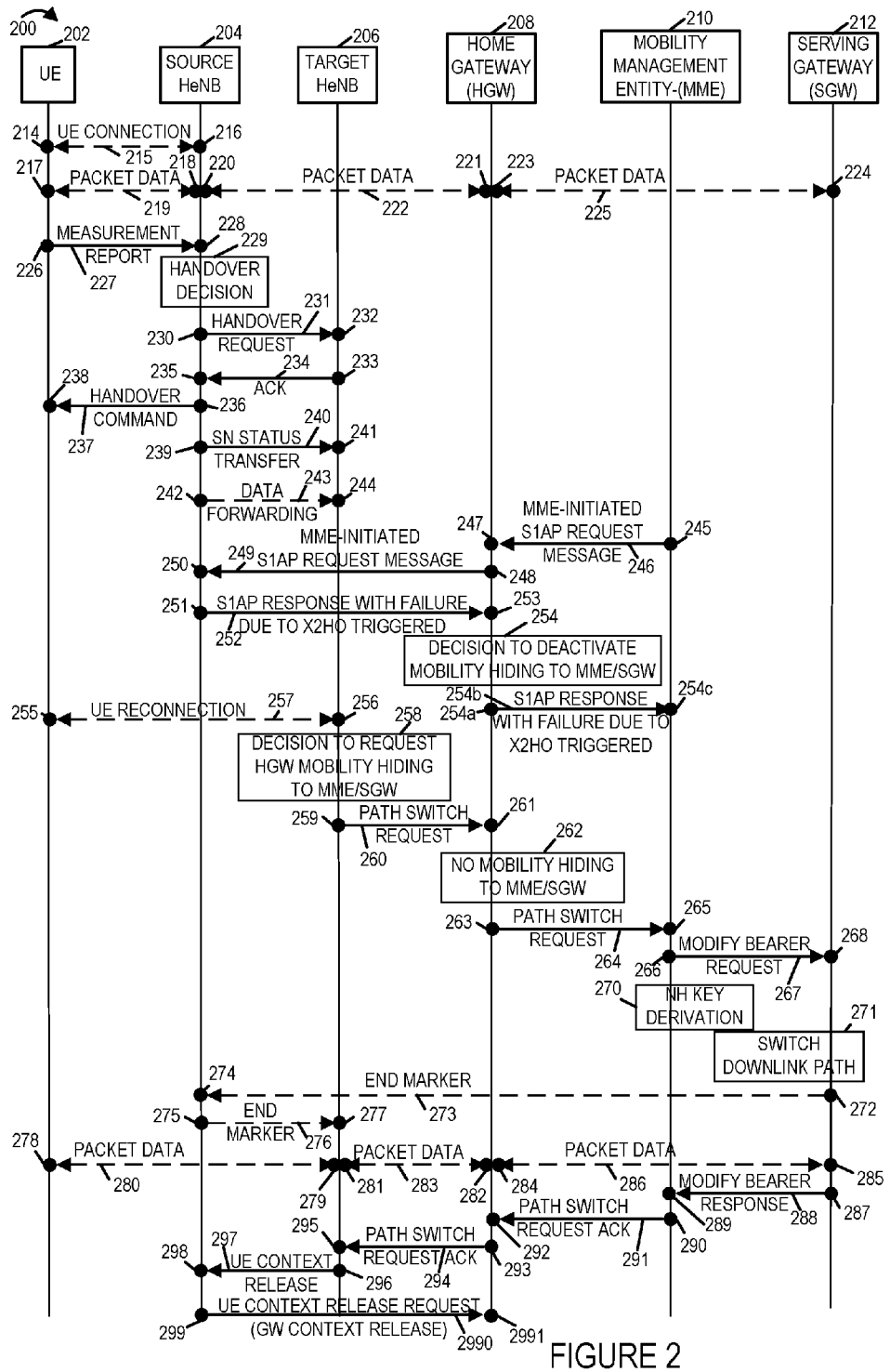
FIG. 2 includes a drawing which illustrates exemplary signaling and exemplary steps in accordance with an exemplary embodiment.

FIG. 2 includes drawing 200 which illustrates exemplary signaling and exemplary steps in accordance with an exemplary embodiment. In drawing 200 there are a plurality of nodes (UE 202, source HeNB 204, target HeNB 206, home gateway (HGW) 208, mobility management entity (MME) 210, and serving gateway (SGW) 212). In one exemplary embodiment, UE 202 is UE 1 132 of FIG. 1; source HeNB 204 is HeNB 1 126 of FIG. 1; target HeNB 206 is HeNB 2 128 of FIG. 1; HGW 208 is HGW 114 of FIG. 1; MME 210 is MME 112 of FIG. 1; and SGW 212 is SGW 110 of FIG. 1.

In step 214 and step 216, UE 202 and source HeNB 204 are operated, respectively, e.g., sending and receiving signals, to establish UE connection 215. In step 217 and 218, UE device 202 and source HeNB 204 are operated, respectively, to communicate packet data 219. In step 220 and 221, source HeNB 204 and HGW 208 are operated, respectively, to communicate packet data 222. In step 223 and 224, HGW 208 and SGW 212 are operated, respectively, to communicate packet data 225.

In step 226, UE 202 generates and communicates, e.g., transmits, measurement report 227 to source HeNB 204. In step 228 source HeNB 204 receives measurement report 227 and recovers the information communicated in the measurement report 227.

In step 229, source HeNB 204 makes a handover decision based on the information communicated in the measurement report 227. In step 230 source HeNB 204 generates and transmits handover request 231 to target HeNB 206. In step 232 target HeNB 206 receives handover request 231. In step 233 target HeNB 206 generates handover request acknowledgement 234 and transmits handover request ack 234 to source HeNB 204. In step 235, source HeNB 204 receives ack 234. In step 236 source HeNB 204 generates and transmits handover command 237 to UE 202. In step 238 UE 202 receives handover command 237.

In step 239 source HeNB 204 generates and transmits SN status transfer message 240 to target HeNB 206, which is received by target HeNB 206 in step 241. Steps 239 and 241 are optional steps which are performed in some but not necessarily all embodiments under some conditions. In some embodiments, steps 239 and 241 are performed during handover when at least one radio bearer is configured in what is known as acknowledged mode (e.g., RLC-AM as per 3GPP TS 36.300). There is no such message 240 sent when all the radio bearers being handed over are configured in the unacknowledged mode (e.g., RLC-UM). In step 242, source HeNB 242 forwards data 243 to target HeNB 206, which is received by target HeNB 206, in step 244.

In step 245 MME 210 generates and sends a MME-initiated S1AP request message 246 to HGW 208. In step 247 HGW 208 receives S1AP request message 246. In step 248, HGW 208 generates and transmits MME-initiated S1AP request message 249 to source HeNB 204. In step 250, source HeNB 204 receives and processes the S1AP request message 249. In step 251 HeNB 204 generates and sends an S1AP response 252 with failure indication. The failure is due to the X2 handoff (HO) which was triggered. In step 253, HGW 208 receives the S1AP response with failure indication 252. In response to the failure, in step 254, HGW 208 decides to deactivate mobility hiding to MME/SGW with regard to UE 202. In step 254*a* the HGW 208 generates and transmits message 254*b*, which forwards the received S1AP response with failure indication. In step 254*c*, MME 210 receives message 254*b* and recovers the information communicated in the S1AP response.

In step 255 and step 256, UE 202 and target HeNB 206 are operated, respectively, e.g., sending and receiving signals, to establish UE reconnection 257. In step 258, target HeNB 206 makes a decision to request HGW mobility hiding to MME/SGW. In step 259, target HeNB 206 generates and sends path switch request 260. In various embodiments, path switch request 260 includes an indicator indicating that target HeNB 206 is requesting a hidden handover. In step 261, HGW 208 receives path switch request 260. In step 262, HGW 208 determines that there is to be no mobility hiding to MME/SGW, based on the decision of step 254. In step 262, HGW 208 determines to implement a visible handover. In step 263, HGW 208 generates and sends path switch request 264 to MME 210. In step 265, MME 210 receives the path switch request 264, In step 266 MME 210 modifies the request and sends the modified bearer request 267 to SGW 212. In step 268, the SGW 212 receives the modified bearer request 267.

In step 270, MME 210 performs an NH key derivation. In step 271, the SGW 212 switches the downlink path. In step 272, SGW 212 generates and sends an end marker message 273 to source HeNB 204. In step 275 source HeNB 204 generates and sends end marker message 276 to target HeNB 206. In step 277, target HeNB 206 receives end marker 276.

In step 278 and 279, UE device 202 and target HeNB 206 are operated, respectively, to communicate packet data 280. In step 281 and 282, target HeNB 206 and HGW 208 are operated, respectively, to communicate packet data 283. In step 284 and 285, HGW 208 and SGW 212 are operated, respectively, to communicate packet data 286.

In step 287 SGW 212 generates and sends modify bearer response 287 to MME 210, which is received by MME 210 in step 289. In step 290, MME 210 generates and send path switch request acknowledgment 291 to HGW 208, which is received by HGW 208 in step 292. Path switch request acknowledgment 291 includes a new security key for UE device 202, which was generated by MME 210. In step 293, HGW 208 generates and send path switch request acknowledgment 294 to target HeNB 206, which is received by target HeNB 206 in step 295. Path switch request acknowledgment 294 includes the new security key for the UE 202, which was received by the HGW 208 from the MME 210. In step 296 target HeNB 206 generates and sends UE context release 297 to source HeNB 204, which is received by source HeNB 204, in step 298. In step 299, source HeNB 204 generates and sends UE context release request 2990, corresponding to a GW context release, to HGW 208, which is received by HGW 208 in step 2991.

In the example, of FIG. 2, it may be observed that a hidden handover is requested by target HeNB 206; however, HGW 208 decides to implement a visible handover based on the detected failure from the signaling initiated from the MME 210.

Figure 3:
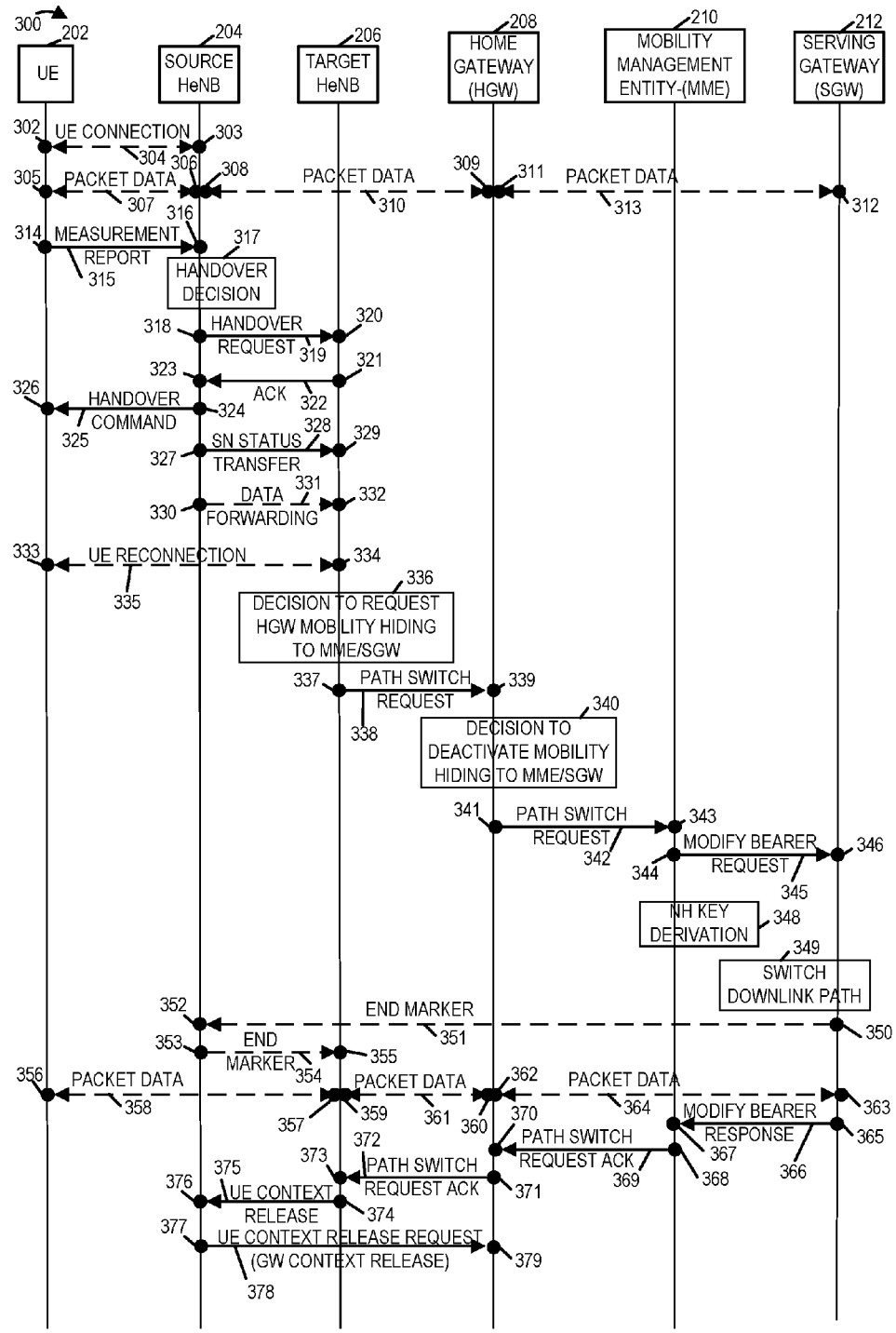
FIG. 3 includes a drawing which illustrates exemplary signaling and exemplary steps in accordance with an exemplary embodiment.

FIG. 3 includes drawing 300 which illustrates exemplary signaling and exemplary steps in accordance with an exemplary embodiment. In drawing 300 there are a plurality of nodes (UE 202, source HeNB 204, target HeNB 206, home gateway (HGW) 208, mobility management entity (MME) 210, and serving gateway (SGW) 212). In one exemplary embodiment, UE 202 is UE 1 132 of FIG. 1; source HeNB 204 is HeNB 1 126 of FIG. 1; target HeNB 206 is HeNB 2 128 of FIG. 2; HGW 208 is HGW 114 of FIG. 1; MME 210 is MME 112 of FIG. 1; and SGW 212 is SGW 110 of FIG. 1.

In step 302 and step 303, UE 202 and source HeNB 204 are operated, respectively, e.g., sending and receiving signals, to establish UE connection 304. In step 305 and 306, UE device 202 and source HeNB 204 are operated, respectively, to communicate packet data 307. In step 308 and 309, source HeNB 204 and HGW 208 are operated, respectively, to communicate packet data 310. In step 311 and 312, HGW 208 and SGW 212 are operated, respectively, to communicate packet data 313.

In step 314, UE 202 generates and communicates, e.g., transmits, measurement report 315 to source HeNB 204. In step 316 source HeNB 204 receives measurement report 315 and recovers the information communicated in the measurement report 315.

In step 317, source HeNB 204 makes a handover decision based on the information communicated in the measurement report 315. In step 318 source HeNB 204 generates and transmits handover request 319 to target HeNB 206. In step 320 target HeNB 206 receives handover request 319. In step 321 target HeNB 206 generates handover request acknowledgement 322 and transmits ACK 322 to source HeNB 204. In step 323, source HeNB 204 receives ack 322. In step 324 source HeNB 204 generates and transmits handover command 325 to UE 202. In step 326 UE 202 receives handover command 325.

In step 327 source HeNB 204 generates and transmits SN status transfer message 328 to target HeNB 206, which is received by target HeNB 206 in step 329. Steps 327 and 329 are optional steps which are performed in some but not necessarily all embodiments under some conditions. In some embodiments, steps 327 and 329 are performed during handover when at least one radio bearer is configured in what is known as acknowledged mode (e.g., RLC-AM as per 3GPP TS 36.300). There is no such message 328 sent when all the radio bearers being handed over are configured in the unacknowledged mode (e.g., RLC-UM). In step 330, source HeNB 242 forwards data 331 to target HeNB 206, which is received by target HeNB 206, in step 332.

In step 333 and step 334, UE 202 and target HeNB 206 are operated, respectively, e.g., sending and receiving signals, to establish UE reconnection 335. In step 336, target HeNB 206 makes a decision to request HGW mobility hiding to MME/SGW. In step 337, target HeNB 206 generates and sends path switch request 338. In various embodiments, path switch request 338 includes an indicator indicating that target HeNB 206 is requesting a hidden handover. In step 339, HGW 208 receives path switch request 338.

In step 340 HGW 208 makes a decision to deactivate mobility hiding to MME/SGW. The decision of step 340 is a decision to implement a visible handover, even though a hidden handover has been requested. In step 341, HGW 208 generates and sends path switch request 342 to MME 210. In step 343, MME 210 receives the path switch request 342. In step 344 MME 210 modifies the request and sends the modified bearer request 345 to SGW 212. In step 346, the SGW 212 receives the modified bearer request 345.

In step 348, MME 210 performs an NH key derivation. In step 349, the SGW 212 switches the downlink path. In step 350, SGW 212 generates and sends an end marker message 351 to source HeNB 204, which is received in step 352. In step 353 source HeNB 204 generates and sends end marker message 354 to target HeNB 206. In step 355, target HeNB 206 receives end marker 354.

In step 356 and 357, UE device 202 and target HeNB 206 are operated, respectively, to communicate packet data 358. In step 359 and 360, target HeNB 206 and HGW 208 are operated, respectively, to communicate packet data 361. In step 362 and 363, HGW 208 and SGW 212 are operated, respectively, to communicate packet data 364.

In step 365 SGW 212 generates and sends modify bearer response 366 to MME 210, which is received by MME 210 in step 367. In step 368, MME 210 generates and send path switch request acknowledgment 369 to HGW 208, which is received by HGW 208 in step 370. Path switch request acknowledgment 369 includes a new security key for UE device 202, which was generated by MME 210. In step 371, HGW 208 generates and send path switch request acknowledgment 372 to target HeNB 206, which is received by target HeNB 206 in step 373. Path switch request acknowledgment 372 includes the new security key for the UE 202, which was received by the HGW 208 from the MME 210. In step 374 target HeNB 206 generates and sends UE context release 375 to source HeNB 204, which is received by source HeNB 204, in step 376. In step 377, source HeNB 204 generates and sends UE context release request 378, corresponding to a GW context release, to HGW 208, which is received by HGW 208 in step 379.

In the example, of FIG. 3, it may be observed that a hidden handover is requested by target HeNB 206; however, HGW 208 decides to implement a visible handover, e.g., based one of: an amount of time which has passed since a new security key was received by HGW 208 for the UE device 202 from MME 210 exceeding a threshold, an amount of data has exceeded a predetermined threshold since a new security key for said UE device 202 was received by said HGW 208 from MME 210, a predetermined number of handoffs having occurred since a new security key for the UE device 202 was received by the HGW 209 from the MME 210, or a determination that the source access point 204 and the target access point 208 are in different security domains. Thus various conditions are tested for by the HGW 208, and, if detected, result in the HGW 208 making a decision to implement a visible handover instead of the requested hidden handover.

Figure 4:
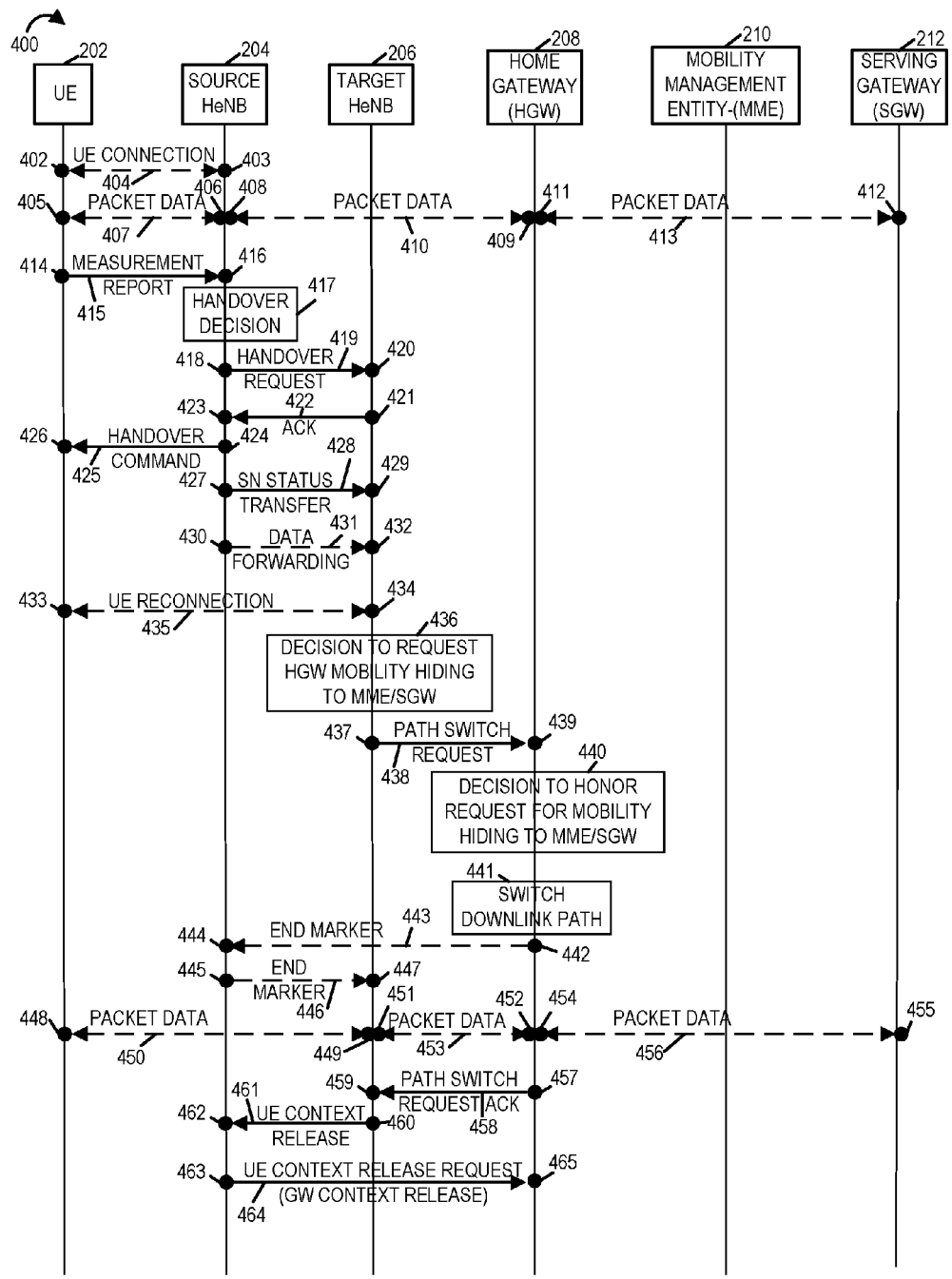
FIG. 4 includes a drawing which illustrates exemplary signaling and exemplary steps in accordance with an exemplary embodiment.

FIG. 4 includes drawing 400 which illustrates exemplary signaling and exemplary steps in accordance with an exemplary embodiment. In drawing 400 there are a plurality of nodes (UE 202, source HeNB 204, target HeNB 206, home gateway (HGW) 208, mobility management entity (MME) 210, and serving gateway (SGW) 212). In one exemplary embodiment, UE 202 is UE 1 132 of FIG. 1; source HeNB 204 is HeNB 1 126 of FIG. 1; target HeNB 206 is HeNB 2 128 of FIG. 1; HGW 208 is HGW 114 of FIG. 1; MME 210 is MME 112 of FIG. 1; and SGW 212 is SGW 110 of FIG. 1.

In step 402 and step 403, UE 202 and source HeNB 204 are operated, respectively, e.g., sending and receiving signals, to establish UE connection 404. In step 405 and 406, UE device 202 and source HeNB 204 are operated, respectively, to communicate packet data 407. In step 408 and 409, source HeNB 204 and HGW 208 are operated, respectively, to communicate packet data 410. In step 411 and 412, HGW 208 and SGW 212 are operated, respectively, to communicate packet data 413.

In step 414, UE 202 generates and communicates, e.g., transmits, measurement report 415 to source HeNB 204. In step 416 source HeNB 204 receives measurement report 415 and recovers the information communicated in the measurement report 415.

In step 417, source HeNB 204 makes a handover decision based on the information communicated in the measurement report 415. In step 418 source HeNB 204 generates and transmits handover request 419 to target HeNB 206. In step 420 target HeNB 206 receives handover request 419. In step 421 target HeNB 206 generates handover request acknowledgement 422 and transmits ACK 422 to source HeNB 204. In step 423, source HeNB 204 receives ACK 422. In step 424 source HeNB 204 generates and transmits handover command 425 to UE 202. In step 426 UE 202 receives handover command 425.

In step 427 source HeNB 204 generates and transmits SN status transfer message 428 to target HeNB 206, which is received by target HeNB 206 in step 429. Steps 427 and 429 are optional steps which are performed in some but not necessarily all embodiments under some conditions. In some embodiments, steps 427 and 429 are performed during handover when at least one radio bearer is configured in what is known as acknowledged mode (e.g., RLC-AM as per 3GPP TS 36.300). There is no such message 428 sent when all the radio bearers being handed over are configured in the unacknowledged mode (e.g., RLC-UM). In step 430, source HeNB 242 forwards data 431 to target HeNB 206, which is received by target HeNB 206, in step 432.

In step 433 and step 434, UE 202 and target HeNB 206 are operated, respectively, e.g., sending and receiving signals, to establish UE reconnection 435. In step 436, target HeNB 206 makes a decision to request HGW mobility hiding to MME/SGW. In step 437, target HeNB 206 generates and sends path switch request 438. In various embodiments, path switch request 438 includes an indicator indicating that target HeNB 206 is requesting a hidden handover. In step 439, HGW 208 receives path switch request 438.

In step 440 HGW 208 makes a decision to honor the request for mobility hiding to MME/SGW. The decision of step 440 is a decision to implement a hidden handover, as requested. In step 441, HGW 208 switches the downlink path. In step 442 HGW 208 generates and sends end marker message 443 to source HeNB 204. In step 444, source HeNB 204 receives end marker 442. In step 445 source HeNB 204 generates and sends end marker message 446 to target HeNB 206. In step 447, target HeNB 206 receives end marker 447.

In step 448 and 449, UE device 202 and target HeNB 206 are operated, respectively, to communicate packet data 450. In step 451 and 452, target HeNB 206 and HGW 208 are operated, respectively, to communicate packet data 453. In step 454 and 455, HGW 208 and SGW 212 are operated, respectively, to communicate packet data 456.

In step 457, HGW 208 generates and send path switch request acknowledgment 458 to target HeNB 206, which is received by target HeNB 206 in step 459. In various embodiments, path switch request acknowledgment 458 includes an indication that no new security keys are being provided as part of said handover. In step 460 target HeNB 206 generates and sends UE context release 461 to source HeNB 204, which is received by source HeNB 204, in step

462. In step 463, source HeNB 204 generates and sends UE context release request 464, corresponding to a GW context release, to HGW 208, which is received by HGW 208 in step 465.

In the example, of FIG. 4, it may be observed that a hidden handover is requested by target HeNB 206; and HGW 208 decides to implement the requested hidden handover, e.g., the tested conditions do not indicate that the hidden handover request is to be disregarded or overridden.

Figure 5:
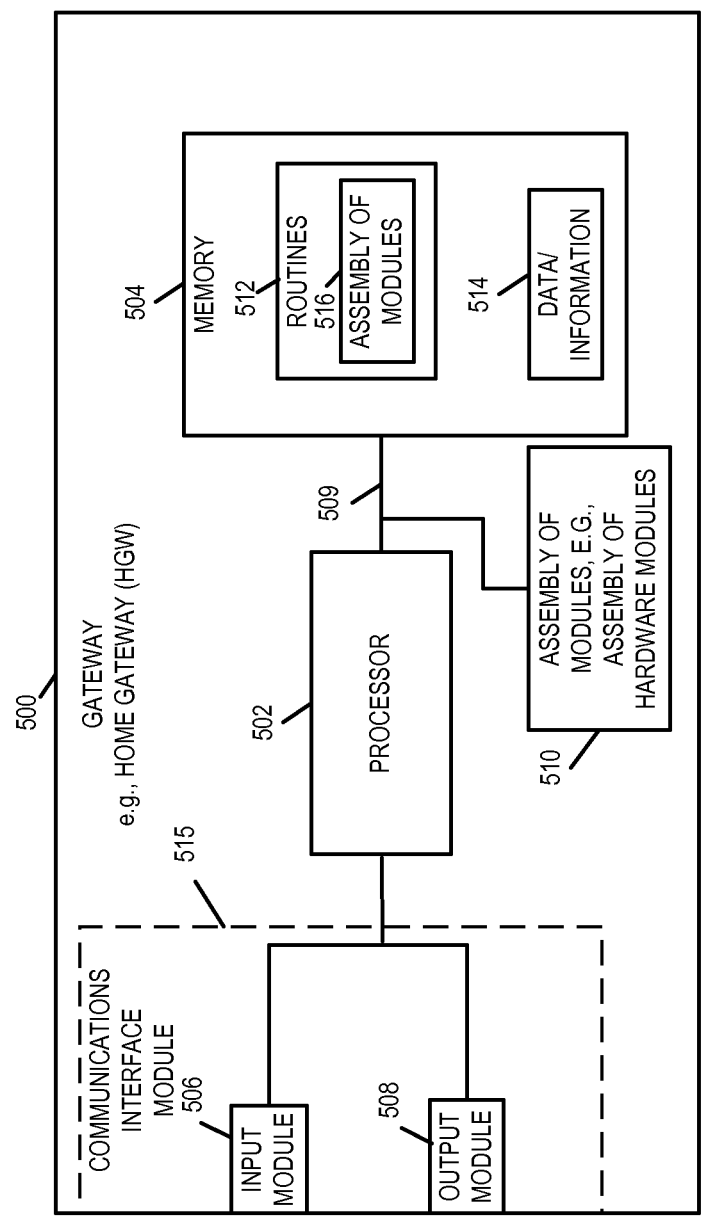
FIG. 5 is a drawing of an exemplary gateway, e.g., a home gateway (HGW), in accordance with an exemplary embodiment.

FIG. 5 is a drawing of an exemplary gateway 500, e.g., a home gateway (HGW), in accordance with an exemplary embodiment. Exemplary communications device 500 is, e.g., HGW 114 of system 100 of FIG. 1 or FIG. 8, HGW 208 of FIG. 2, FIG. 3, FIG. 4, FIG. 9 or FIG. 10, and/or a HWG implementing the method of flowchart 600 of FIG. 6.

Gateway 500, e.g., a home gateway (HGW), includes a processor 502, e.g., a CPU, memory 504, and an assembly of modules 510, e.g., an assembly of hardware modules, coupled together via a bus 509 over which the various elements may exchange data and information. Gateway 500 further includes an input module 506 and an output module 508, which are coupled to the processor 502. In various the input module 506 and the output module 508 are included as part of a communications interface module 515. In various embodiments, communications interface module 515 includes interfaces for communications with different types of devices, e.g. HeNBs, a MME, a SGW, a PGW, etc. and/or supporting a plurality of different communications protocols. The input module 506 and/or output module 508 may, in some embodiments do, include a plurality of different ports and/or interfaces. Input module 506 includes one or more receivers, and output module 508 includes one or more transmitters. Gateway 500 receives signals including messages via input 502. Exemplary messages received by input module 506 include a path switch request message from a target access point requesting a hidden handover, and a path switch request acknowledgment message from a MME including a new security key, corresponding to a visible handover. Gateway 500 transmits signals including messages via output module 508. Exemplary messages transmitted by output module 508 include an end marker message corresponding to a hidden handover, a path switch request acknowledgment signal including an indication that no new security keys are being provided, which corresponds to a hidden handover, and a path switch request acknowledgment signal including a new security key, which corresponds to a visible handover. Memory 504 includes routines 512 and data/information 514. Routines 512 includes an assembly of modules 516.

Figure 6:
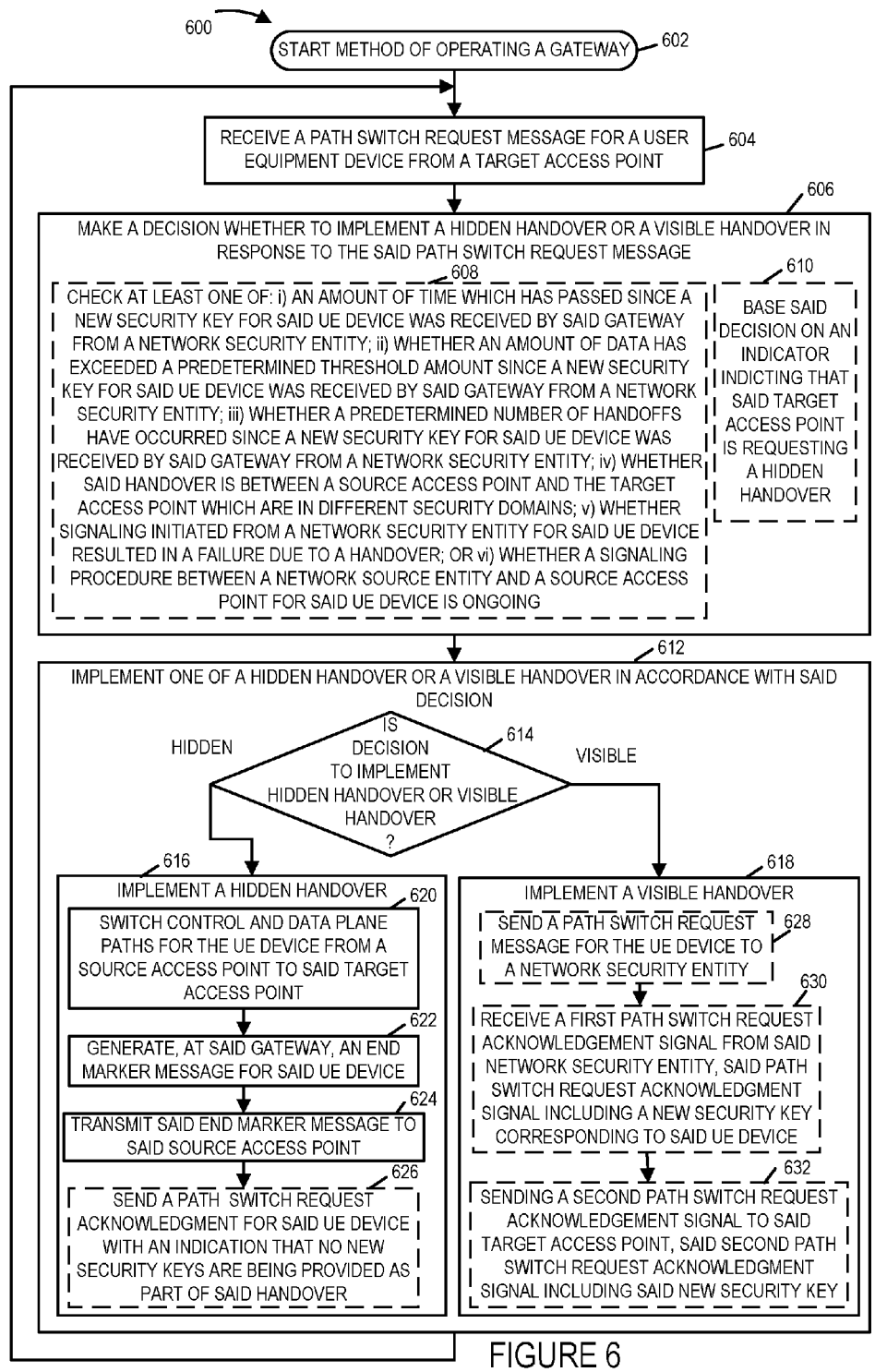
FIG. 6 is a flowchart of an exemplary method of operating a gateway, e.g., a home gateway (HGW), in accordance with various exemplary embodiments.

FIG. 6 is a flowchart 600 of an exemplary method of operating a gateway, e.g., a home gateway (HGW), in accordance with various exemplary embodiments. Operation starts in step 602, in which the gateway is powered on and initialized. Operation proceeds from step 602 to step 604. In step 604 the gateway receives a path switch request message for a user equipment (UE) device, e.g., a terminal, from a target access point, e.g., a target HeNB. In various embodiments, the path switch request message may, and sometimes does, include an indicator indicating that the target access point is requesting a hidden handover. Operation proceeds from step 604 to step 606.

In step 606, the gateway device makes a decision whether to implement a hidden handover or a visible handover in response to said path switch request message. In various embodiments, step 606 includes one or both of steps 608 and 610. In step 608, the gateway checks at least one of: i) an amount of time which has passed since a new security key for said UE device was received by said gateway from a network security entity, e.g., a MME; ii) whether an amount of data, e.g., an uplink amount, a downlink amount, or a combined uplink and downlink amount, has exceeded a predetermined threshold amount since a new security key for said UE device was received by said gateway from a network security entity, e.g., a MME; iii) whether a predetermined number of handoffs have occurred since a new security key for said UE device was received by said gateway from a network security entity, e.g., a MME; iv) whether said handover is between a source access point and the target access point which are in different security domains; v) whether signaling initiated from a network security entity, e.g., a MME, for said UE device resulted in a failure due to a handover; or vi) whether a signaling procedure between a network security entity, e.g. a MME, and a source access point, e.g. a HeNB, for said UE device is ongoing, e.g., was initiated but has not completed. In some embodiments, the new security key is a key used for encryption or signing of communication by the UE device and the network security entity is a mobility management entity (MME).

In step 610 the gateway bases said decision on an indicator indicating that said target access point is requesting a hidden handover.

In various embodiments, for the gateway device to decide to implement a hidden handover, a hidden handover is determined to be indicated to be requested and a set of test checks indicates satisfactory results for a hidden handover, the set of test checks corresponding to a subset or the full set of checks of step 608. Exemplary satisfactory results for allowing a requested hidden handover are: (i) the amount of time which has passed since a new security key for said UE device was received by said gateway from a network security entity is below a predetermined threshold time; ii) the amount of data, e.g., an uplink amount, a downlink amount, or a combined uplink and downlink amount, has not exceeded a predetermined threshold amount since a new security key for said UE device was received by said gateway from a network security entity; iii) the number of handoffs which have occurred since a new security key for said UE device was received by said gateway from a network security entity is below a predetermined handoff count threshold number; iv) said handover is determined to be between a source access point and the target access point which are not in different security domains; v) signaling initiated from a network security entity, e.g., a MME, for said UE device has not resulted in a failure due to a handover; and vi) there is not an ongoing signaling procedure between a network security entity, e.g. a MME, and a source access point, e.g. a HeNB, for said UE device.

Operation proceeds from step 606 to step 612. In step 612 the gateway implements one of a hidden handover or a visible handover in accordance with said decision. Step 612 includes steps 614, 616 and 618. In step 614 the gateway controls operation as a function of the result of the decision whether to implement a hidden handover or a visible handover. If the decision is to implement a hidden handover then, operation proceeds from step 614 to step 616. However, if the decision is to implement a visible handover, then operation proceeds from step 614 to step 618. Note that in some embodiments, the received path switch request message may have included an indicator indicating that the target access point is requesting a hidden handover; however, the decision may have been a decision to implement a visible handover, e.g., the gateway ignored or otherwise decided to proceed with a visible handover despite the request for a hidden handover.

In step 616, the gateway implements a hidden handover. Step 616 includes steps 620, 622, and 624. In some embodiments, step 616 further includes step 626. In step 620 the gateway switches control and data plane paths for the UE device from a source access point to said target access point. Operation proceeds from step 620 to step 622, in which the gateway generates, at said gateway, and end marker message for said UE device. In various embodiments, the switching and generating said end marker message of steps 620 and 622 are performed without involvement of a mobility management entity (MME) or serving gateway. Operation proceeds from step 622 to step 624. In step 624 the gateway transmits said end marker message to said source access point. In some embodiments, operation proceeds from step 624 to step 626, in which the gateway sends a path switch request acknowledgment for said UE device with an indication that no new security keys are being provided as part of said handover.

In step 618, the gateway implements a visible handover. In various embodiments, step 618 includes steps 628, 630 and 632. In step 628 the gateway sends a path switch request message for the UE device to a network security entity. Operation proceeds from step 628 to step 630. In step 630 the gateway receives a first path switch request acknowledgment signal from said network security entity, said path switch request acknowledgment signal including a new security key corresponding to said UE device. Operation proceeds from step 630 to step 632. In step 632, the gateway sends a second path switch request acknowledgment signal to said target access point, said second path switch request acknowledgment signal including a new security key. In some exemplary scenarios, the second path switch request acknowledgment signal triggers an intra-cell handover for the UE device at the target access point therein putting said new security key into use.

Operation proceeds from step 612 to step 614, in which the gateway receives another path switch request message for a user equipment device from a target access point.

Figure 7:
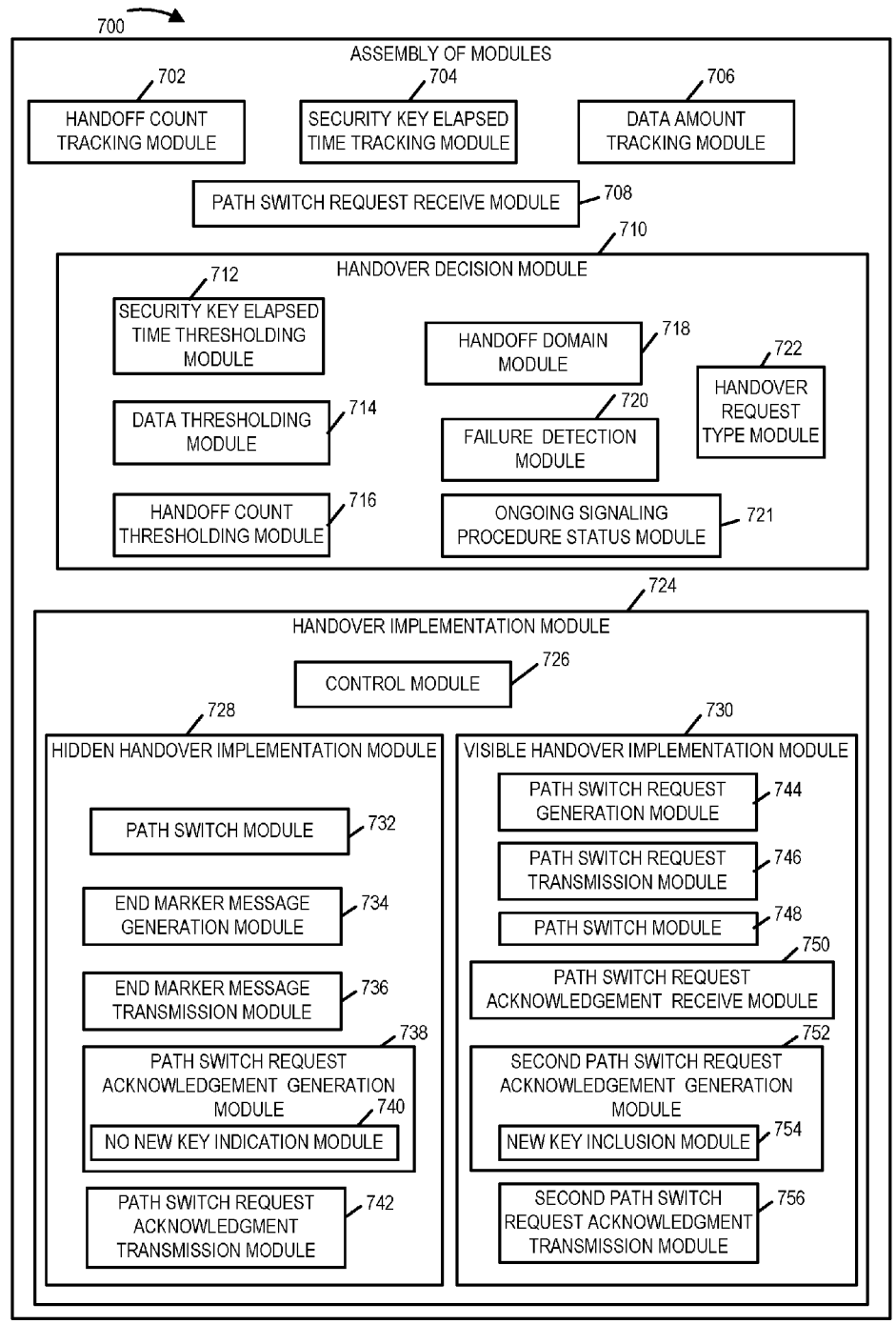
FIG. 7 is a drawing of an assembly of modules which may be included in an exemplary gateway, e.g., an exemplary HGW, in accordance with an exemplary embodiment.

FIG. 7 is a drawing of an assembly of modules 700 which may be included in an exemplary gateway, e.g., an exemplary HGW, in accordance with an exemplary embodiment. Assembly of modules 700 which can, and in some embodiments is, used in the gateway 500, e.g., a HGW, illustrated in FIG. 5, in the HGW 208 illustrated in FIGS. 2-4, and/or in the HGW 114 illustrated in FIG. 1 and FIG. 8. The modules in the assembly of modules 700 can, and in some embodiments are, implemented fully in hardware within the processor 502, e.g., as individual circuits. The modules in the assembly of modules 700 can, and in some embodiments are, implemented fully in hardware within the assembly of modules 510, e.g., as individual circuits corresponding to the different modules. In other embodiments some of the modules are implemented, e.g., as circuits, within the processor 502 with other modules being implemented, e.g., as circuits within assembly of modules 510, external to and coupled to the processor 502. As should be appreciated the level of integration of modules on the processor and/or with some modules being external to the processor may be one of design choice.

Alternatively, rather than being implemented as circuits, all or some of the modules may be implemented in software and stored in the memory 504 of the gateway 500, with the modules controlling operation of gateway 500 to implement the functions corresponding to the modules when the modules are executed by a processor, e.g., processor 502. In some such embodiments, the assembly of modules 700 is included in the memory 504 as assembly of modules 516. In still other embodiments, various modules in assembly of modules 700 are implemented as a combination of hardware and software, e.g., with another circuit external to the processor providing input to the processor 502 which then under software control operates to perform a portion of a module's function. While shown in the FIG. 5 embodiment as a single processor, e.g., computer, it should be appreciated that the processor 502 may be implemented as one or more processors, e.g., computers.

When implemented in software the modules include code, which when executed by the processor 502, configure the processor 502 to implement the function corresponding to the module. In embodiments where the assembly of modules 700 is stored in the memory 504, the memory 504 is a computer program product comprising a computer readable medium comprising code, e.g., individual code for each module, for causing at least one computer, e.g., processor 502, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the gateway 500 or elements therein such as the processor 502, to perform the functions of the corresponding steps illustrated in the method flowchart 600 of FIG. 6. Thus the assembly of modules 700 includes various modules that perform functions of the corresponding steps of the method shown in FIG. 6.

Assembly of modules 700 includes a handoff count tracking module 702, a security key elapsed time tracking module 704, a data amount tracking module 706, and a path switch request receive module 708. Handoff count tracking module 702 maintains a count of the number of handoffs which have occurred since a new security key for a UE device was received by the gateway from a network security entity. Security key elapsed time tracking module 704 tracks the amount of time which has passed since a new security key for a UE device was received by the gateway from a network security entity. Data amount tracking module 706 tracks the amount of data for a UE device which was received by the gateway since a new security key for the UE device was received by the gateway from a network security entity. Path switch request receive module 708 is configured to receive a path switch request message for a user equipment device form a target access point.

Assembly of modules 700 further includes a handover decision module 710. Handover decision module 710 includes a security key elapsed time thresholding module 712, a data thresholding module 714, a handoff count thresholding module 716, a handoff domain module 718, a failure detection module 720, an ongoing signaling procedure status module 721 and a handoff request type module 722.

Handover decision module 710 is configured to make a decision whether to implement a hidden handover or a visible handover in response to a received path switch request message. Security key elapsed time thresholding module 712 is configured to check an amount of time which has passed since a new security key for a UE device was received by the gateway from a network security entity, e.g., against a security key time validity lifetime value. Data thresholding module 714 is configured to check whether an amount of data has exceeded a predetermined threshold amount since a new security key for the UE device was received by said gateway from a network security entity. Handoff count thresholding module 716 is configured to check whether a predetermined number of handoffs have occurred since a new security key for said UE device was received by said gateway from a network security entity. The new security key is a key used for encryption of signal of communications by the UE device. In various embodiments, the network security entity is a mobility management entity (MME).

Handoff count thresholding module 716 is configured to check whether said handoff is between a source access point and the target access point which are in different security domains. Failure detection module 720 is configured to check whether signaling initiated from a network security entity for said UE device resulted in a failure due to a handover. Ongoing signaling procedure status module 721 is configured to check whether or not there is an ongoing signaling procedure between a network security entity, e.g. a MME, and a source access point, e.g. a HeNB, for said UE device. Handoff request type module 722 is configured to base said decision whether to implement a hidden handover or a visible handover on an indicator indicating that said target access point is requesting a hidden handover. In various embodiments, the handover decision module 710 uses the indicator determination from the handover request type module 722 in making the decision whether to implement a hidden handover or a visible handover. In some such embodiments, for the handover decision module 710 to decide to implement a hidden handover, a hidden handover request needs to be included in the path switch request message and each of a predetermined set of test checks needs to pass to allow the hidden handover request to be granted, e.g., a security key time test needs to determine there is sufficient time remaining, a data thresholding test needs to determine that the amount of data is below a predetermined level, a handoff count test needs to determine that the number of handoff is below a predetermined number, etc.

Assembly of modules 700 further includes a handoff implementation module 724. Handoff implementation module 724 includes a control module 726, a hidden handover implementation module 728 and a visible handover implementation module 730.

Handoff implementation module 724 is configured to implement one of a hidden handover or a visible handover in accordance with the decision of handover decision module 710. Control module 726 is configured to control operation to implement a hidden handover when the decision is to implement a hidden handover, e.g., controlling hidden handover implementation module 728 to operate. Control module 726 is further configured to control operation to implement a visible handover when the decision is to implement a visible handover, e.g., controlling visible handover implementation module 730 to operate.

Hidden handover implementation module 728 includes a path switch module 732, an end marker message generation module 734, an end marker message transmission module 736, a path switch request acknowledgement generation module 738 and a path switch request acknowledgement transmission module 742. Path switch request acknowledgement generation module 738 includes a no new key indication module 740. Hidden handover implementation module 728 is configured to implement a hidden handover. Path switch module 732 is configured to switch control and data plane paths for the UE device from a source access point to a target access point. End marker message generation module 734 is configured to generate, at said gateway, an end marker message for said UE device. End marker message transmission module 736 is configured to transmit said end marker message to said source access point. Path switch request acknowledgment generation module 738 is configured to generate an path switch request for said UE device with an indication that no new security keys are being provided as part of said handover. No new key indication module 740 is configured to generate the indication that no new security keys are being provided as part of said handover. Path switch request acknowledgment transmission module 742 is configured to send a generated path switch request acknowledgment for said UE device with an indication that no new security keys are being provided as part of said handover. In various embodiments, the switching performed by path switch module 732 and the generating performed by said end marker generation module 736 are performed without involvement of a mobility management entity (MME) or a serving gateway (SGW).

Visible handover implementation module 730 includes a path switch request generation module 744, a path switch request transmission module 746, a path switch module 748, a path switch request acknowledgment receive module 750, a second path switch request acknowledgement generation module 752, and a second path request acknowledgement transmission module 756. Second path switch request acknowledgement generation module 752 includes a new key inclusion module 754. Visible handover implementation module 730 is configured to implement a visible handover. Path switch request generation module 744 is configured to generate a path switch request message for the UE device to a network security entity. Path switch request transmission module 744 is configured to send a generated path switch request message for the UE device to the network security entity. Path switch module 748 is configured to switch control and data plane paths for the UE device from a source access point to a target access point. Path switch request acknowledgement receive module 750 is configured to receive a first path switch request acknowledgment signal from said network security entity, said path switch request acknowledgment signal including a new security key corresponding to said UE device. Second path switch request acknowledgment generate module 752 is configured to generate a second path switch request acknowledgment signal, said second path switch request acknowledgment signal including said new security key. New key inclusion module 754 is configured to include the new security key received from the network security entity in the second path switch request acknowledgment. Second path switch request acknowledgment transmission module 756 is configured to second the second path switch request acknowledgment signal to said target access point, said second path switch request acknowledgement signal including said new security key. In various embodiments, the second path switch request acknowledgment signal triggers an intra-cell handover at the target access point thereby putting the new security key into use.

Figure 8:
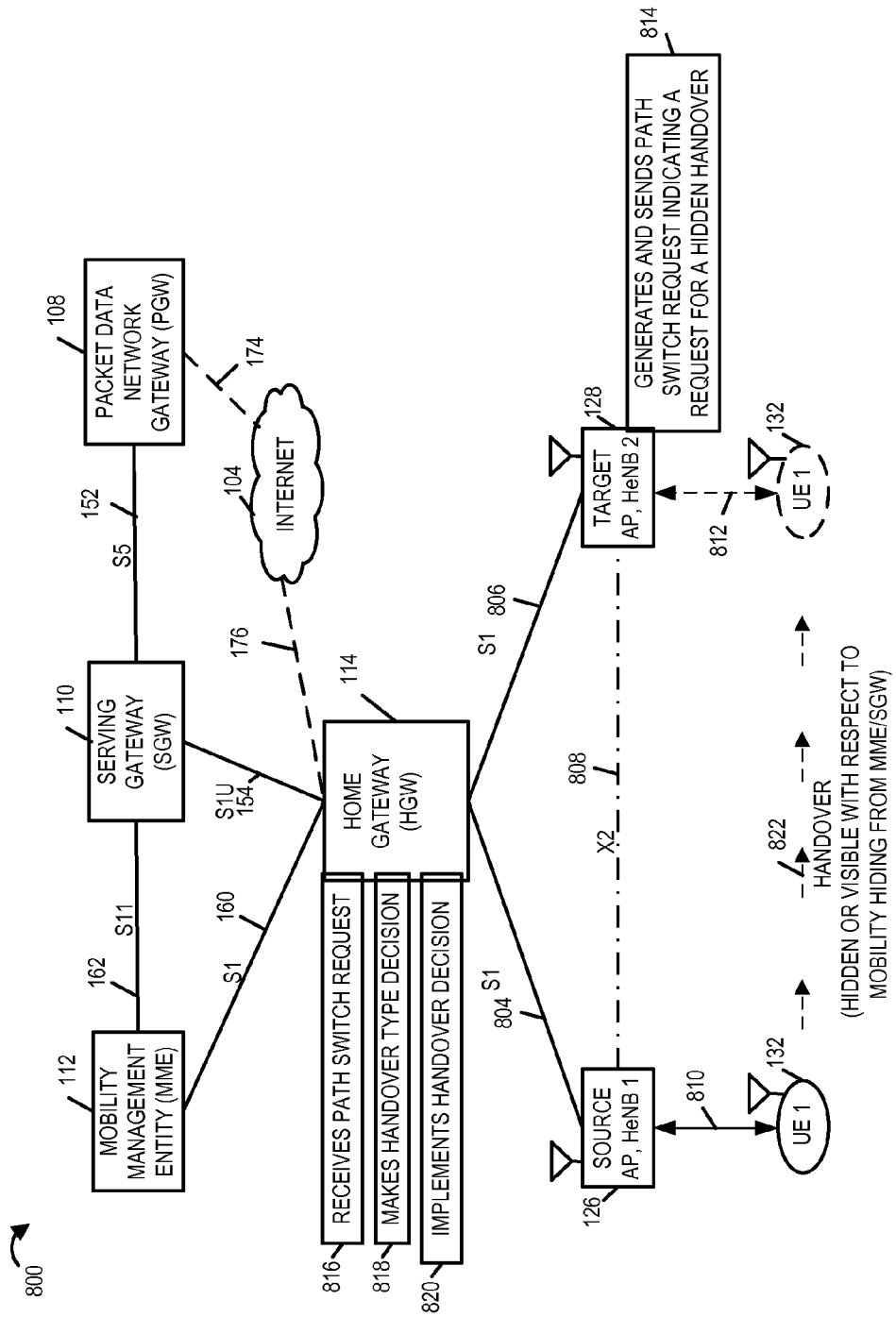
FIG. 8 is a drawing illustrating an exemplary handoff of a UE device from a source access point to a target access point, in which the decision whether to implement a hidden handoff or a visible handoff is performed by an home gateway in accordance with an exemplary embodiment.

FIG. 8 is a drawing 800 illustrating an exemplary handoff of UE device 132 from a source access point, HeNB 1 126, to a target access point, HeNB 2 128, in which the decision whether to implement a hidden handoff or a visible handoff, with regard to mobility hiding from the MME 112/SGW 110, is performed by home gateway (HGW) 114 in accordance with an exemplary embodiment.

HGW 114 is coupled to MME 112 via S1 interface 160. HGW 114 is coupled to SGW 110 via S1U interface 154. MME 112 is coupled to SGW 110 via S11 interface 162.

SGW 110 is coupled to PGW 108 via S5 interface 152. In some embodiments, HGW 114 is coupled to Internet 104 via link 176, and Internet 104 is coupled to PGW 108 via link 174.

Home Gateway 114 is coupled to source AP, HeNB 1 126, via S1 interface 804. Home Gateway 114 is coupled to target AP, HeNB 2 128, via S1 interface 806. There is an X 2 interface 808 between HeNB 1 126 and HeNB 2 128. UE 1 132 has a wireless connection 810 with HeNB 126. UE 1 126 establishes a wireless connection 812 with HeNB 128, as part of the handoff process.

In the example of FIG. 8, the target access point, which is HeNB 2 128, generates and sends a path switch request indicating a request for a hidden handover, as indicated by box 814. The HGW 114 receives the path switch request, as indicated by box 816. HGW 114 makes a handover type decision, deciding between implementing a hidden handover or a visible handover, as indicated by box 818. Step 608 in flowchart 600 illustrates exemplary criteria used in deciding which type of handover to implement. HGW 114 implements one of a hidden handover or a visible handover in accordance with the decision, as indicated by box 820. Steps 616, 620, 622, 624, and 626 of flowchart 600 illustrates exemplary steps performed by HGW 110 in implementing a hidden handover. Steps 618, 630 and 632 of flowchart 600 illustrates exemplary steps performed by HGW 110 in implementing a visible handover.

It should be noted that implementing a hidden handover eliminates various control signaling and operations, e.g., with regard to MME 210 and SGW 212. This has the beneficial effect of reducing control signaling load on the backhaul and reducing processing load on the MME/SGW, than would otherwise be the case if all handovers were visible handovers.

Figure 9:
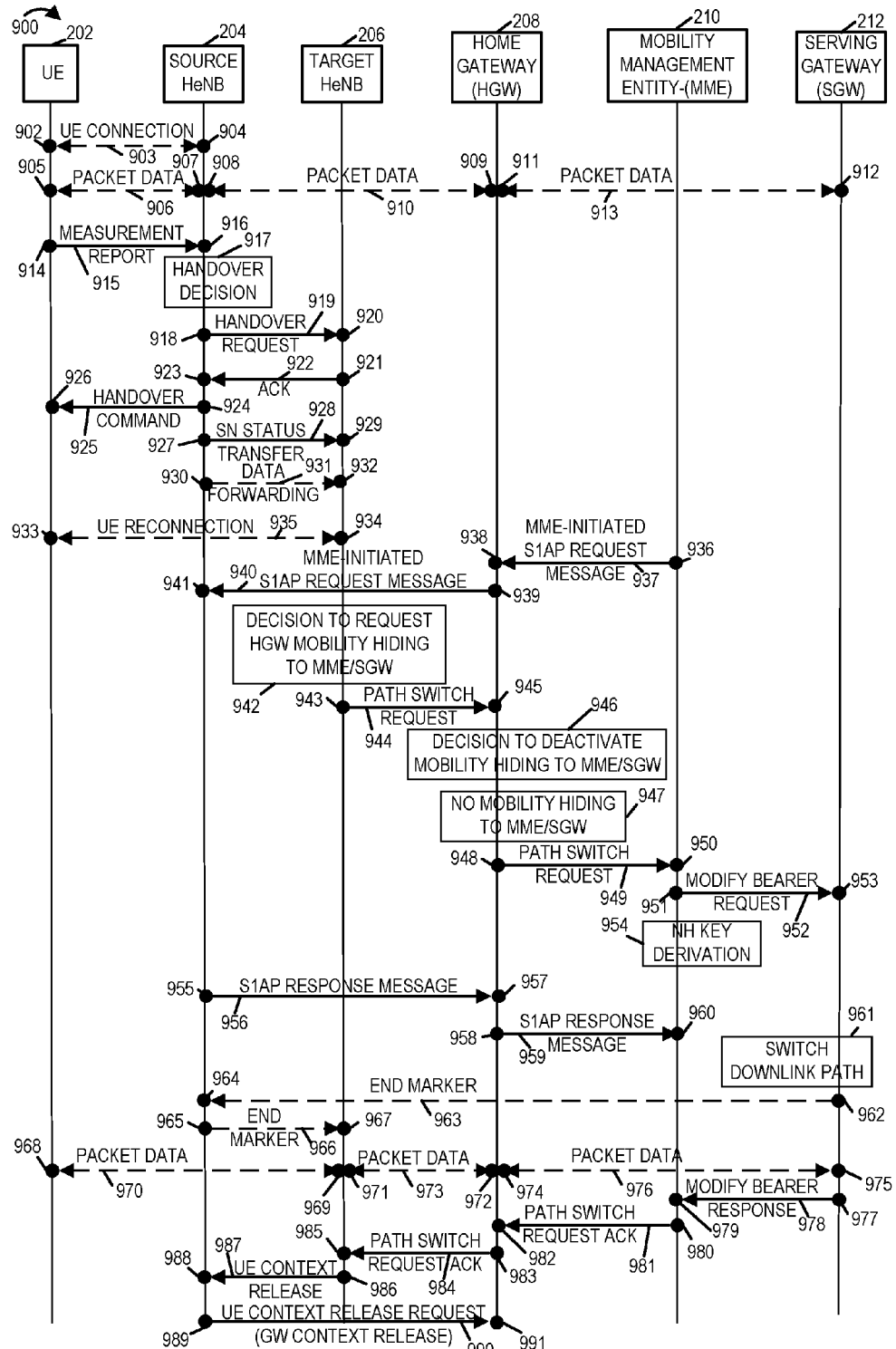
FIG. 9 includes a drawing which illustrates exemplary signaling and exemplary steps in accordance with an exemplary embodiment.

FIG. 9 includes drawing 900 which illustrates exemplary signaling and exemplary steps in accordance with an exemplary embodiment. In drawing 900 there are a plurality of nodes (UE 202, source HeNB 204, target HeNB 206, home gateway (HGW) 208, mobility management entity (MME) 210, and serving gateway (SGW) 212). In one exemplary embodiment, UE 202 is UE 1 132 of FIG. 1; source HeNB 204 is HeNB 1 126 of FIG. 1; target HeNB 206 is HeNB 2 128 of FIG. 1; HGW 208 is HGW 114 of FIG. 1; MME 210 is MME 112 of FIG. 1; and SGW 212 is SGW 110 of FIG. 1.

In step 902 and step 904, UE 202 and source HeNB 204 are operated, respectively, e.g., sending and receiving signals, to establish UE connection 903. In step 905 and 907, UE device 202 and source HeNB 204 are operated, respectively, to communicate packet data 906. In step 908 and 909, source HeNB 204 and HGW 208 are operated, respectively, to communicate packet data 910. In step 911 and 912, HGW 208 and SGW 212 are operated, respectively, to communicate packet data 913.

In step 914, UE 202 generates and communicates, e.g., transmits, measurement report 915 to source HeNB 204. In step 916 source HeNB 204 receives measurement report 915 and recovers the information communicated in the measurement report 915.

In step 917, source HeNB 204 makes a handover decision based on the information communicated in the measurement report 915. In step 918 source HeNB 204 generates and transmits handover request 919 to target HeNB 206. In step 920 target HeNB 206 receives handover request 919. In step 921 target HeNB 206 generates handover request acknowledgement 922 and transmits handover request ack 922 to source HeNB 204. In step 923, source HeNB 204 receives ack 922. In step 924 source HeNB 204 generates and transmits handover command 925 to UE 202. In step 926 UE 202 receives handover command 925.

In step 927 source HeNB 204 generates and transmits SN status transfer message 928 to target HeNB 206, which is received by target HeNB 206 in step 929. Steps 927 and 929 are optional steps which are performed in some but not necessarily all embodiments under some conditions. In some embodiments, steps 927 and 929 are performed during handover when at least one radio bearer is configured in what is known as acknowledged mode (e.g., RLC-AM as per 3GPP TS 36.300). There is no such message 928 sent when all the radio bearers being handed over are configured in the unacknowledged mode (e.g., RLC-UM). In step 930, source HeNB 242 forwards data 931 to target HeNB 206, which is received by target HeNB 206, in step 932.

In step 933 and step 934, UE 202 and target HeNB 206 are operated, respectively, e.g., sending and receiving signals, to establish UE reconnection 935.

In step 936 MME 210 generates and sends a MME-initiated S1AP request message 937 to HGW 208. In step 938 HGW 208 receives S1AP request message 937. In step 939, HGW 208 generates and transmits MME-initiated S1AP request message 940 to source HeNB 204.

In step 941, source HeNB 204 receives and starts to process the S1AP request message 940.

In step 942, target HeNB 206 makes a decision to request HGW mobility hiding to MME/SGW. In step 943, target HeNB 206 generates and sends path switch request 944. In various embodiments, path switch request 944 includes an indicator indicating that target HeNB 206 is requesting a hidden handover. In step 945, HGW 208 receives path switch request 944. In step 946, HGW 208 decides to deactivate mobility hiding to MME/SGW with regard to UE 202, since there is a pending MME initiated procedure, e.g., a response has not be received for the MME initiated S1AP request message 937. In step 947, HGW 208 determines that there is to be no mobility hiding to MME/SGW, based on the decision of step 946. In step 947, HGW 208 determines to implement a visible handover. In step 948, HGW 208 generates and sends path switch request 949 to MME 210. In step 950, MME 210 receives the path switch request 949. In step 951 MME 210 modifies the request and sends the modified bearer request 952 to SGW 212. In step 953, the SGW 212 receives the modified bearer request 952.

In step 954, MME 210 performs an NH key derivation.

In step 955 HeNB 204 generates and sends an S1AP response message 956. In step 957, HGW 208 receives the S1AP response message 956. In step 958 the HGW 208 generates and transmits message 959, which forwards the received S1AP response. In step 960, MME 210 receives message 959 communicating the S1AP response and recovers the information communicated in the S1AP response.

In step 961, the SGW 212 switches the downlink path. In step 962, SGW 212 generates and sends an end marker message 963 to source HeNB 204, which is received by source HeNB 204 in step 964. In step 965 source HeNB 204 generates and sends end marker message 966 to target HeNB 206. In step 967, target HeNB 206 receives end marker message 966.

In step 968 and 969, UE device 202 and target HeNB 206 are operated, respectively, to communicate packet data 970. In step 971 and 972, target HeNB 206 and HGW 208 are operated, respectively, to communicate packet data 973. In step 974 and 975, HGW 208 and SGW 212 are operated, respectively, to communicate packet data 976.

In step 977 SGW 212 generates and sends modify bearer response 978 to MME 210, which is received by MME 210 in step 979. In step 980, MME 210 generates and send path switch request acknowledgment 981 to HGW 208, which is received by HGW 208 in step 982. Path switch request acknowledgment 981 includes a new security key for UE device 202, which was generated by MME 210. In step 983, HGW 208 generates and send path switch request acknowledgment 984 to target HeNB 206, which is received by target HeNB 206 in step 985. Path switch request acknowledgment 984 includes the new security key for the UE 202, which was received by the HGW 208 from the MME 210. In step 986 target HeNB 206 generates and sends UE context release 987 to source HeNB 204, which is received by source HeNB 204, in step 988. In step 989, source HeNB 204 generates and sends UE context release request 990, corresponding to a GW context release, to HGW 208, which is received by HGW 208 in step 991.

In the example, of FIG. 9, it may be observed that a hidden handover is requested by target HeNB 206; however, HGW 208 decides to implement a visible handover based a determination that a signaling procedure between a network security entity, which is MME 210, and a source access point, which is source HeNB 204, for said UE device 202 is ongoing, e.g., was initiated but has not completed. In particular MME-initiated S1AP message 937 has not be responded to at the point in time in which the decision is made by HGW 208 as to whether or not to perform a hidden handover.

Figure 10:
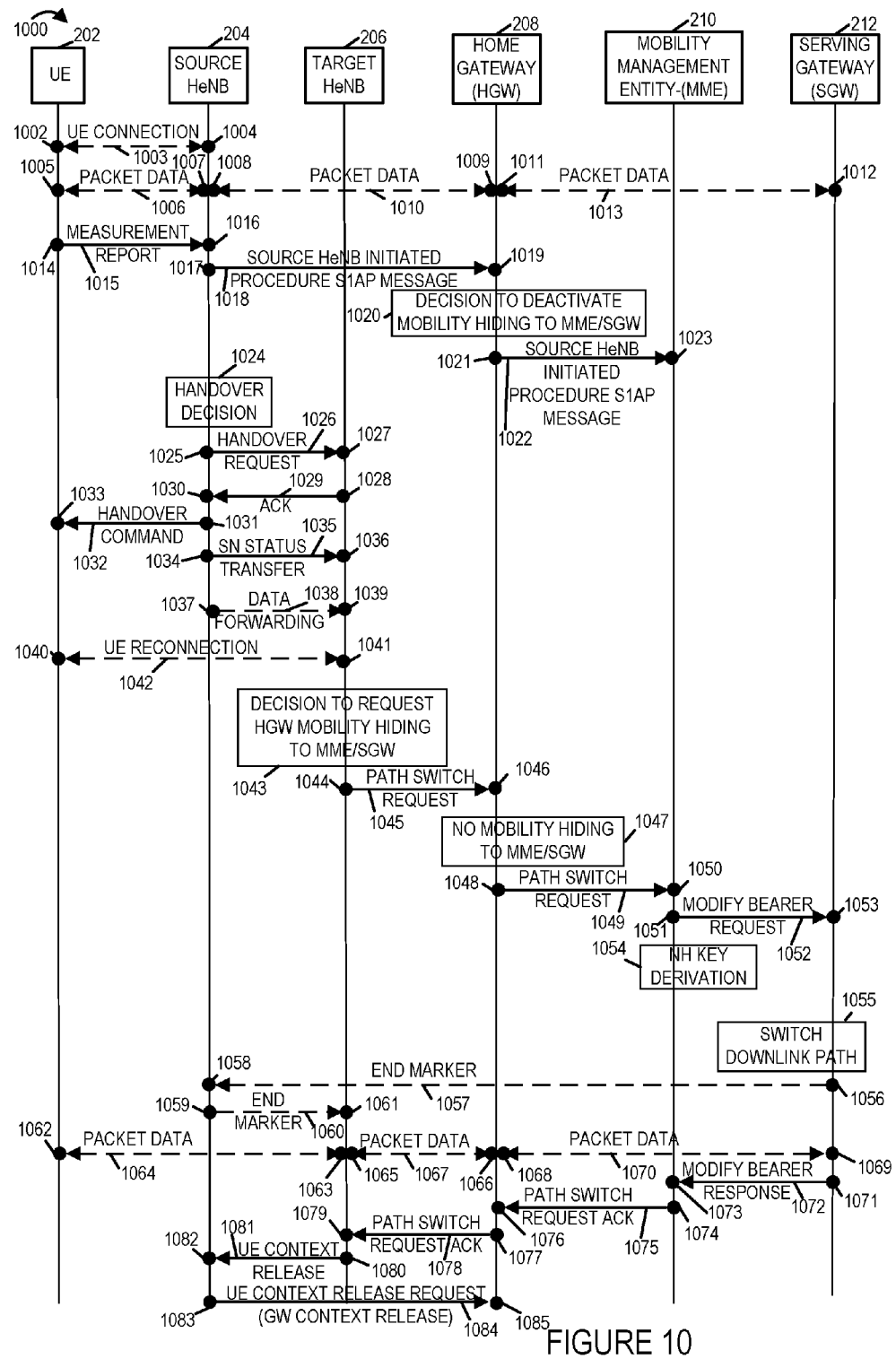
FIG. 10 includes a drawing which illustrates exemplary signaling and exemplary steps in accordance with an exemplary embodiment.

FIG. 10 includes drawing 1000 which illustrates exemplary signaling and exemplary steps in accordance with an exemplary embodiment. In drawing 1000 there are a plurality of nodes (UE 202, source HeNB 204, target HeNB 206, home gateway (HGW) 208, mobility management entity (MME) 210, and serving gateway (SGW 212). In one exemplary embodiment, UE 202 is UE 1 132 of FIG. 1; source HeNB 204 is HeNB 1 126 of FIG. 1; target HeNB 206 is HeNB 2 128 of FIG. 1; HGW 208 is HGW 114 of FIG. 1; MME 210 is MME 112 of FIG. 1; and SGW 212 is SGW 110 of FIG. 1.

In step 1002 and step 1004, UE 202 and source HeNB 204 are operated, respectively, e.g., sending and receiving signals, to establish UE connection 1003. In step 1005 and 1007, UE device 202 and source HeNB 204 are operated, respectively, to communicate packet data 1006. In step 1008 and 1009, source HeNB 204 and HGW 208 are operated, respectively, to communicate packet data 1010. In step 1011 and 1012, HGW 208 and SGW 212 are operated, respectively, to communicate packet data 1013.

In step 1014, UE 202 generates and communicates, e.g., transmits, measurement report 1015 to source HeNB 204. In step 1016 source HeNB 204 receives measurement report 227 and recovers the information communicated in the measurement report 1015.

In step 1017 source HeNB 204 generates and sends a source HeNB-initiated procedure S1AP message 1018 to HGW 208. In step 1019 HGW 208 receives source HeNB initiated procedure S1AP message 1019. In response to the received HeNB initiated procedure S1AP message, in step 1020, HGW 208 decides to deactivate mobility hiding to MME/SGW with regard to UE 202, since there is a pending source eNB initiated procedure with regard to UE 202.

In step 1021, HGW 208 generates and transmits source HeNB-initiated procedure S1AP message 1022 to MME 210. In step 1023, MME 210 receives and start to process the source HeNB initiated procedure S1AP message 1023.

In step 1024, source HeNB 204 makes a handover decision, e.g., based on the information communicated in the measurement report 1015. In step 1025 source HeNB 204 generates and transmits handover request 1026 to target HeNB 206. In step 1027 target HeNB 206 receives handover request 1026. In step 1028 target HeNB 206 generates handover request acknowledgement 1029 and transmits handover request ack 1029 to source HeNB 204. In step 1030, source HeNB 204 receives ack 1029. In step 1031 source HeNB 204 generates and transmits handover command 1032 to UE 202. In step 1033 UE 202 receives handover command 1032.

In step 1034 source HeNB 204 generates and transmits SN status transfer message 1035 to target HeNB 206, which is received by target HeNB 206 in step 1036. Steps 1034 and 1036 are optional steps which are performed in some but not necessarily all embodiments under some conditions. In some embodiments, steps 1034 and 1036 are performed during handover when at least one radio bearer is configured in what is known as acknowledged mode (e.g., RLC-AM as per 3GPP TS 36.300). There is no such message 1035 sent when all the radio bearers being handed over are configured in the unacknowledged mode (e.g., RLC-UM). In step 1036, source HeNB 242 forwards data 1038 to target HeNB 206, which is received by target HeNB 206, in step 1039.

In step 1040 and step 1041, UE 202 and target HeNB 206 are operated, respectively, e.g., sending and receiving signals, to establish UE reconnection 1042. In step 1043, target HeNB 206 makes a decision to request HGW mobility hiding to MME/SGW. In step 1044, target HeNB 206 generates and sends path switch request 1045. In various embodiments, path switch request 1045 includes an indicator indicating that target HeNB 206 is requesting a hidden handover. In step 1046, HGW 208 receives path switch request 1045. In step 1047, HGW 208 determines that there is to be no mobility hiding to MME/SGW, based on the decision of step 1020. In step 1047, HGW 208 determines to implement a visible handover. In step 1048, HGW 208 generates and sends path switch request 1049 to MME 210. In step 1050, MME 210 receives the path switch request 1049. In step 1051 MME 210 modifies the request and sends the modified bearer request 1052 to SGW 212. In step 1053, the SGW 212 receives the modified bearer request 1052.

In step 1054, MME 210 performs an NH key derivation. In step 1055, the SGW 212 switches the downlink path. In step 1056, SGW 212 generates and sends an end marker message 1057 to source HeNB 204, which is received by source HeNB 204 in step 1058. In step 1059 source HeNB 204 generates and sends end marker message 1060 to target HeNB 206. In step 1061, target HeNB 206 receives end marker 1060.

In step 1062 and 1063, UE device 202 and target HeNB 206 are operated, respectively, to communicate packet data 1064. In step 1065 and 1066, target HeNB 206 and HGW 208 are operated, respectively, to communicate packet data 1067. In step 1068 and 1069, HGW 208 and SGW 212 are operated, respectively, to communicate packet data 1070.

In step 1071 SGW 212 generates and sends modify bearer response 1072 to MME 210, which is received by MME 210 in step 1073. In step 1074, MME 210 generates and send path switch request acknowledgment 1075 to HGW 208, which is received by HGW 208 in step 1076. Path switch request acknowledgment 1075 includes a new security key for UE device 202, which was generated by MME 210. In step 1077, HGW 208 generates and send path switch request acknowledgment 1078 to target HeNB 206, which is received by target HeNB 206 in step 1079. Path switch request acknowledgment 1078 includes the new security key for the UE 202, which was received by the HGW 208 from the MME 210. In step 1080 target HeNB 206 generates and sends UE context release 1081 to source HeNB 204, which is received by source HeNB 204, in step 1082. In step 1083, source HeNB 204 generates and sends UE context release request 1084, corresponding to a GW context release, to HGW 208, which is received by HGW 208 in step 1085.

In the example, of FIG. 10, it may be observed that a hidden handover is requested by target HeNB 206; however, HGW 208 decides to implement a visible handover based on the detected pending source eNB initiated procedure, which is an ongoing signaling procedure between MME 210, which is a network security entity, and a source access point HeNB 204, for UE device 202.

The techniques of various embodiments may be implemented using software, hardware and/or a combination of software and hardware. Various embodiments are directed to apparatus, e.g., communications device such as home gateway (HGW), access point, e.g., an HeNB, a mobility management entity (MME), serving gateway (SGW), and/or a user equipment (UE) device, etc. Various embodiments are also directed to methods, e.g., a method of operating a communications device such as a home gateway (HGW), access point, e.g., an HeNB, a mobility management entity (MME), serving gateway (SGW), and/or a user equipment (UE) device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, making a handover type decision, implementing the decision, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a gateway, e.g., a Home Gateway (HGW), including a processor configured to implement one, multiple or all of the steps of one or more methods of the invention.

In some embodiments, the processor or processors, e.g., CPUs, of one or more devices, e.g., of the communications device, e.g., a gateway such as a HGW, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a gateway such as a HGW, with a processor which includes a module corresponding to each of the steps of the various described methods performed by the device in which the processor is included. In some but not all embodiments an apparatus, e.g., a communications device, e.g., a gateway such as a HGW, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a gateway such as a HGW. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A gateway, comprising:
   a path switch request receive module configured to receive a path switch request message for a user equipment (UE) device from a target access point;
   a handover decision module configured to make a decision whether to implement a hidden handover or a visible handover in response to said path switch request message; and
   a handover implementation module configured to implement one of a hidden handover or a visible handover in accordance with said decision, said handover implementation module including a visible handover implementation module; and wherein said visible handover implementation module includes:
- a path switch request transmission module configured to send a path switch request message for the UE device to a network security entity;
- a path switch request acknowledgment receive module configured to receive a first path switch request acknowledgement signal from said network security entity, said first path switch request acknowledgement signal including a new security key corresponding to said UE device; and
- a second path switch request acknowledgment transmission module configured to send a second path switch request acknowledgement signal to said target access point, said second path switch request acknowledgement signal including said new security key.

2. A method of operating a gateway, comprising:
receiving a path switch request message for a user equipment (UE) device from a target access point;
making a decision whether to implement a hidden handover or a visible handover in response to said path switch request message, wherein making a decision includes:
checking at least one of i) an amount of time which has passed since a new security key for said UE device was received by said gateway from a network security entity; ii) whether an amount of data has exceeded a predetermined threshold amount since a new security key for said UE device was received by said gateway from a network security entity; iii) whether a predetermined number of handovers have occurred since a new security key for said UE device was received by said gateway from a network security entity; iv) whether said handover is between a source access point and the target access point which are in different security domains; v) whether signaling initiated from a network security entity (MME) for said UE device resulted in a failure due to a handover; or vi) whether there is an ongoing signaling procedure between a network security entity and a source access point for said UE device; and
implementing one of a hidden handover or a visible handover in accordance with said decision.

3. The method of claim 2 wherein said new security key is a key used for encryption or signing of communications by said UE device; and
wherein said network security entity is a mobility management entity (MME).

4. A method of operating a gateway, comprising:
receiving a path switch request message for a user equipment (UE) device from a target access point;
making a decision whether to implement a hidden handover or a visible handover in response to said path switch request message; and
implementing one of a hidden handover or a visible handover in accordance with said decision; and
when said decision is a decision to implement a hidden handover, implementing the hidden handover includes:
switching control and data plane paths for the UE device from a source access point to said target access point;
generating, at said gateway, an end marker message for said UE device; and
transmitting said end marker message to said source access point.

5. The method of claim 4, wherein said switching and generating said end marker message are performed without involvement of a mobility management entity (MME) or a serving gateway.

6. The method of claim 4, wherein said path switch request message includes an indicator indicating that said target access point is requesting a hidden handover.

7. The method of claim 6, wherein making a decision whether to implement a hidden handover or a visible handover is based on said indicator indicating that said target access point is requesting the hidden handover.

8. The method of claim 4, wherein said implementing said hidden handover further includes:
sending a path switch request acknowledgment for said UE device with an indication that no new security keys are being provided as part of said handover.

9. A method of operating a gateway, comprising:
receiving a path switch request message for a user equipment (UE) device from a target access point;
making a decision whether to implement a hidden handover or a visible handover in response to said path switch request message; and
implementing one of a hidden handover or a visible handover in accordance with said decision; and
wherein said path switch request message includes an indicator indicating that said target access point is requesting a hidden handover, the method further comprising:
when said decision is a decision to implement a visible handover, implementing said visible handover includes:
sending a path switch request message for the UE device to a network security entity;
receiving a first path switch request acknowledgement signal from said network security entity, said first path switch request acknowledgement signal including a new security key corresponding to said UE device; and
sending a second path switch request acknowledgement signal to said target access point, said second path switch request acknowledgement signal including said new security key.

10. The method of claim 9, wherein said second path switch request acknowledgment signal triggers an intra-cell handover for the UE device at said target access point therein putting said new security key into use.

11. A non-transitory machine readable medium including processor executable instructions, which when executed by a processor of a gateway control said gateway to:
receive a path switch request message for a user equipment (UE) device from a target access point;
make a decision whether to implement a hidden handover or a visible handover in response to said path switch request message, wherein making a decision includes:
checking at least one of i) an amount of time which has passed since a new security key for said UE device was received by said gateway from a network security entity; ii) whether an amount of data has exceeded a predetermined threshold amount since a new security key for said UE device was received by said gateway from a network security entity; iii) whether a predetermined number of handovers have occurred since a new security key for said UE device was received by said gateway from a network security entity; iv) whether said handover is between a source access point and the target access point which are in different security domains; v) whether signaling initiated from a network security entity (MME) for said UE device resulted in a failure due to a handover; or vi) whether there is an ongoing signaling procedure between a network security entity and a source access point for said UE device; and implement one of a hidden handover or a visible handover in accordance with said decision.

12. A gateway, comprising:
a path switch request receive module configured to receive a path switch request message for a user equipment (UE) device from a target access point;
a handover decision module configured to make a decision whether to implement a hidden handover or a visible handover in response to said path switch request message, wherein said handover decision module includes at least one of:
  i) a security key elapsed time thresholding module configured to check an amount of time which has passed since a new security key for said UE device was received by said gateway from a network security entity;
  ii) a data thresholding module configured to check whether an amount of data has exceeded a predetermined threshold amount since a new security key for said UE device was received by said gateway from a network security entity;
  iii) a handoff count thresholding module configured to check whether a predetermined number of handovers have occurred since a new security key for said UE device was received by said gateway from a network security entity;
  iv) a handoff domain module configured to check whether said handover is between a source access point and the target access point which are in different security domains;
  v) a failure detection module configured to check whether signaling initiated from a network security entity for said UE device resulted in a failure due to a handover; or
  vi) an ongoing signaling procedure status module configured to check whether or not there is an ongoing signaling procedure between a network security entity and a source access point for said UE device; and
a handover implementation module configured to implement one of a hidden handover or a visible handover in accordance with said decision.

13. The gateway of claim 12 wherein said new security key is a key used for encryption or signing of communications by said UE device; and wherein said network security entity is a mobility management entity (MME).

14. A gateway, comprising:
a path switch request receive module configured to receive a path switch request message for a user equipment (UE) device from a target access point;
a handover decision module configured to make a decision whether to implement a hidden handover or a visible handover in response to said path switch request message; and
a handover implementation module configured to implement one of a hidden handover or a visible handover in accordance with said decision, wherein said handover implementation module includes a hidden handover implementation module, and
wherein said hidden handover implementation module includes:
  a path switch module configured to switch control and data plane paths for the UE device from a source access point to said target access point;
  an end marker generation module configured to generate, at said gateway, an end marker message for said UE device; and
  an end marker transmission module configured to transmit said end marker message to said source access point.

15. The gateway of claim 14, wherein said switching and generating said end marker message are performed without involvement of a mobility management entity (MME) or a serving gateway.

16. The gateway of claim 14, wherein said path switch request message includes an indicator, which may indicate that said target access point is requesting a hidden handover.

17. The gateway of claim 16, wherein said handover decision module includes a handover request type module configured to determine if said indicator is indicating that said target access point is requesting the hidden handover, and
wherein said handover decision module uses said indicator determination in making the decision whether to implement a hidden handover or a visible handover.

18. The gateway of claim 14, wherein said hidden handover implementation module further includes:
a path switch request acknowledgment transmission module configured to send a path switch request acknowledgment for said UE device with an indication that no new security keys are being provided as part of said handover.

* * * * *